United States Patent
Cheng

(10) Patent No.: US 12,478,872 B2
(45) Date of Patent: Nov. 25, 2025

(54) METHOD AND APPARATUS FOR CONTROLLING INTERFACE DISPLAY, DEVICE, AND STORAGE MEDIUM

(71) Applicant: Tencent Technology (Shenzhen) Company Limited, Shenzhen (CN)

(72) Inventor: Junzhang Cheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 545 days.

(21) Appl. No.: 17/949,031

(22) Filed: Sep. 20, 2022

(65) Prior Publication Data
US 2023/0017694 A1    Jan. 19, 2023

Related U.S. Application Data

(63) Continuation of application No. PCT/CN2021/112672, filed on Aug. 16, 2021.

(30) Foreign Application Priority Data

Sep. 30, 2020  (CN) .......................... 202011062334.3

(51) Int. Cl.
*A63F 13/52*    (2014.01)
*A63F 13/2145*    (2014.01)
(Continued)

(52) U.S. Cl.
CPC .......... *A63F 13/50* (2014.09); *A63F 13/2145* (2014.09); *A63F 13/52* (2014.09);
(Continued)

(58) Field of Classification Search
CPC ...... A63F 13/50; A63F 13/2145; A63F 13/52; G06F 3/04845; G06F 3/04883
(Continued)

(56) References Cited

U.S. PATENT DOCUMENTS

2003/0043113 A1    3/2003  Itoh
2009/0094555 A1    4/2009  Viitala
(Continued)

FOREIGN PATENT DOCUMENTS

CN    102693074 A    9/2012
CN    103631467 A    3/2014
(Continued)

OTHER PUBLICATIONS

Tencent Technology, Extended European Search Report, EP21874096.7, Sep. 8, 2023, 8 pgs.
(Continued)

*Primary Examiner* — Ryan Hsu
(74) *Attorney, Agent, or Firm* — Morgan, Lewis & Bockius LLP

(57) ABSTRACT

A method for controlling a display of an interface of a mobile terminal includes: displaying, while a first game application is running, a first game interface and a first virtual key in a main user interface in a full-screen mode. The first virtual key configured to control the first game application. In accordance with a determination that a switch mode is triggered, providing a first sub-interface and a first touch interface, the first touch interface being configured to display a virtual key for controlling the first game application. The method includes zooming out of the first game interface; displaying the first game interface in the first sub-interface, and displaying the first virtual key in the first touch interface. The method allows a user to continue a game in progress without having to frequently switch the interface, thereby simplifying the user operation.

19 Claims, 28 Drawing Sheets

(51) Int. Cl.
 *A63F 13/50* (2014.01)
 *G06F 3/04845* (2022.01)
 *G06F 3/04883* (2022.01)

(52) U.S. Cl.
 CPC ...... *G06F 3/04845* (2013.01); *G06F 3/04883* (2013.01); *A63F 2300/1075* (2013.01); *A63F 2300/308* (2013.01); *G06F 2203/04806* (2013.01)

(58) Field of Classification Search
 USPC .......................................................... 463/31
 See application file for complete search history.

(56) References Cited

U.S. PATENT DOCUMENTS

| | | | |
|---|---|---|---|
| 2010/0073303 A1* | 3/2010 | Wu | G06F 3/0488 345/173 |
| 2010/0100849 A1 | 4/2010 | Fram | |
| 2010/0277414 A1 | 11/2010 | Tartz et al. | |
| 2010/0315366 A1 | 12/2010 | Lee et al. | |
| 2011/0007018 A1 | 1/2011 | McKinley et al. | |
| 2015/0182856 A1 | 7/2015 | Mays, III et al. | |
| 2018/0046368 A1* | 2/2018 | Cheng | G06F 3/14 |
| 2020/0409512 A1 | 12/2020 | Jing et al. | |

FOREIGN PATENT DOCUMENTS

| | | |
|---|---|---|
| CN | 106406732 A | 2/2017 |
| CN | 106681584 A | 5/2017 |
| CN | 107102801 A | 8/2017 |
| CN | 107831979 A | 3/2018 |
| CN | 107870790 A | 4/2018 |
| CN | 108762861 A | 11/2018 |
| CN | 109117069 A | 1/2019 |
| CN | 109165076 A | 1/2019 |
| CN | 109240791 A | 1/2019 |
| CN | 110012156 A | 7/2019 |
| CN | 111669462 A | 9/2020 |
| CN | 112121415 A | 12/2020 |
| EP | 2487576 A2 | 8/2012 |
| JP | 2008017374 A | 1/2008 |
| JP | 2012168932 A | 9/2012 |
| JP | 2017199238 A | 11/2017 |
| JP | 6423974 B1 | 11/2018 |
| JP | 2019511029 A | 4/2019 |
| WO | WO 2012/092296 A2 | 7/2012 |
| WO | WO 2013069796 A1 | 5/2013 |
| WO | WO 2017161815 A1 | 9/2017 |
| WO | WO 2019/174467 A1 | 9/2019 |

OTHER PUBLICATIONS

Tencent Technology, Japanese Office Action, JP Patent Application No. 2022-565833, Apr. 16, 2024, 12 pgs.
Tencent Technology, ISR, PCT/CN2021/112672, Nov. 17, 2021, 3 pgs.
Tencent Technology, WO, PCT/CN2021/112672, Nov. 17, 2021, 4 pgs.
Tencent Technology, IPRP, PCT/CN2021/112672, Mar. 23, 2023, 5 pgs.
Tencent Technology, Japanese Office Action, JP Patent Application No. 2022-565833, Nov. 21, 2023, 12 pgs.
Tencent Technology, India Office Action, IN Patent Application No. 202247064073, Sep. 26, 2023, 7 pgs.

* cited by examiner (A)

(B)

(A)

(B)

METHOD AND APPARATUS FOR CONTROLLING INTERFACE DISPLAY, DEVICE, AND STORAGE MEDIUM

CROSS-REFERENCE TO RELATED APPLICATIONS

This application is a continuation application of PCT Patent Application No. PCT/CN2021/112672, entitled "METHOD, APPARATUS, DEVICE, AND STORAGE MEDIUM FOR CONTROLLING INTERFACE DISPLAY" filed on Aug. 16, 2021, which claims priority to Chinese Patent Application No. 202011062334.3, filed with the State Intellectual Property Office of the People's Republic of China on Sep. 30, 2020, and entitled "METHOD AND APPARATUS FOR CONTROLLING INTERFACE DISPLAY, DEVICE, AND STORAGE MEDIUM", all of which are incorporated herein by reference in their entirety.

FIELD OF THE TECHNOLOGY

This application relates to the field of interface display technologies, and in particular, to controlling interface display.

BACKGROUND OF THE DISCLOSURE

With the continuous development of the Internet technologies, types of applications are increasingly diverse, and demands of users for the display function of mobile terminals are growing day by day. Either in people's daily communication or in work and entertainment, the mobile terminal plays a very important role.

Currently, games run on the mobile terminals mainly include standalone games and online games. After downloading a game application, a user can play the game on a mobile terminal. Usually, a game interface is displayed on the mobile terminal in full-screen mode, and the user can operate the game in a display interface of the mobile terminal.

However, the mobile terminal not only functions to provide a game service, but also functions to provide many other services. In accordance with a determination that another service is to be performed during the game, the user may need to suspend the game or switch running of the game to the background. In accordance with a determination that the user wants to resume the game, the user may have to start the game application again, which consequently makes the entire operation process more cumbersome, the man-machine interaction is more frequent and consumes more processing resources of the mobile terminal.

SUMMARY

Embodiments of this application provide a method and an apparatus for controlling interface display, a device, and a storage medium, to implement an operation of a user on another service on a mobile terminal while continuing a game progress without requiring the user to switch the interface frequently, thereby simplifying the user operation. In addition, a quantity of times of human computer interaction is reduced, and consumption of processing resources of the mobile terminal is reduced.

In view of this, an aspect of this application provides a method for controlling a display of an interface display of a mobile terminal, the method including:

displaying, while a first game application is running, a first game interface and a first virtual key in a main user interface in a full-screen mode, the first virtual key being configured to control the first game application; and in accordance with a determination that a switch mode is triggered:

zooming out of the first game interface;

displaying the first game interface in a first sub-; and displaying the first virtual key in a first touch interface, the first sub-interface and the first touch interface being provided in the main user interface in accordance with a determination that the switch mode is triggered, the first touch interface being configured to display a virtual key for controlling the first game application.

Another aspect of this application provides an apparatus for controlling interface display, deployed on a mobile terminal, the apparatus including:

a display module, configured to display, while a first game application is running, a first game interface and a first virtual key in a main user interface in full-screen mode, the first virtual key being configured to control the first game application, the display module being further configured to display, in accordance with a determination that a switch mode is triggered, the first game interface in a first sub-interface after the first game interface is zoomed out, and display the first virtual key in a first touch interface, the first sub-interface and the first touch interface being provided in the main user interface in accordance with a determination that the switch mode is triggered, the first touch interface being configured to display a virtual key for controlling the first game application.

Another aspect of this application provides a mobile terminal, including: a memory and a processor, the memory being configured to store a program; and the processor being configured to execute the program in the memory, and the processor being configured to perform, according to instructions in the program, the method according to the foregoing aspects.

Another aspect of this application provides a computer-readable storage medium, including instructions, causing, when run on a computer, the computer to perform the method according to the foregoing aspects.

Another aspect of this application provides a computer program product or a computer program, including computer instructions, the computer instructions being stored in a computer-readable storage medium. A processor of a computer device reads the computer instructions from the computer-readable storage medium. The processor executes the computer instructions, to cause the computer device to perform the method according to the foregoing aspects.

It can be learned from the foregoing technical solutions that the embodiments of this application have the following advantages:

In this embodiment of this application, a method for controlling interface display is provided. A mobile terminal displays, while a first game application is running, a first game interface and a first virtual key in a main user interface in full-screen mode. The mobile terminal provides, in accordance with a determination that a switch mode is satisfied, a first sub-interface and a first touch interface in the main user interface, the first touch interface being configured to display a virtual key for controlling the first game application, displays, after the first game interface is zoomed out, the first game interface in the first sub-interface, and displays the first virtual key in the first touch interface. In the foregoing manner, a sub-interface configured to display a game interface and a touch interface configured to control a game are provided in the main user interface, to implement an operation of a user on another service on a mobile terminal while continuing a game progress without requiring the user to switch the interface frequently, thereby simplifying the user operation. In addition, a quantity of times of human computer interaction is reduced, and consumption of processing resources of the mobile terminal is reduced.

DESCRIPTION OF EMBODIMENTS

Figure 1:
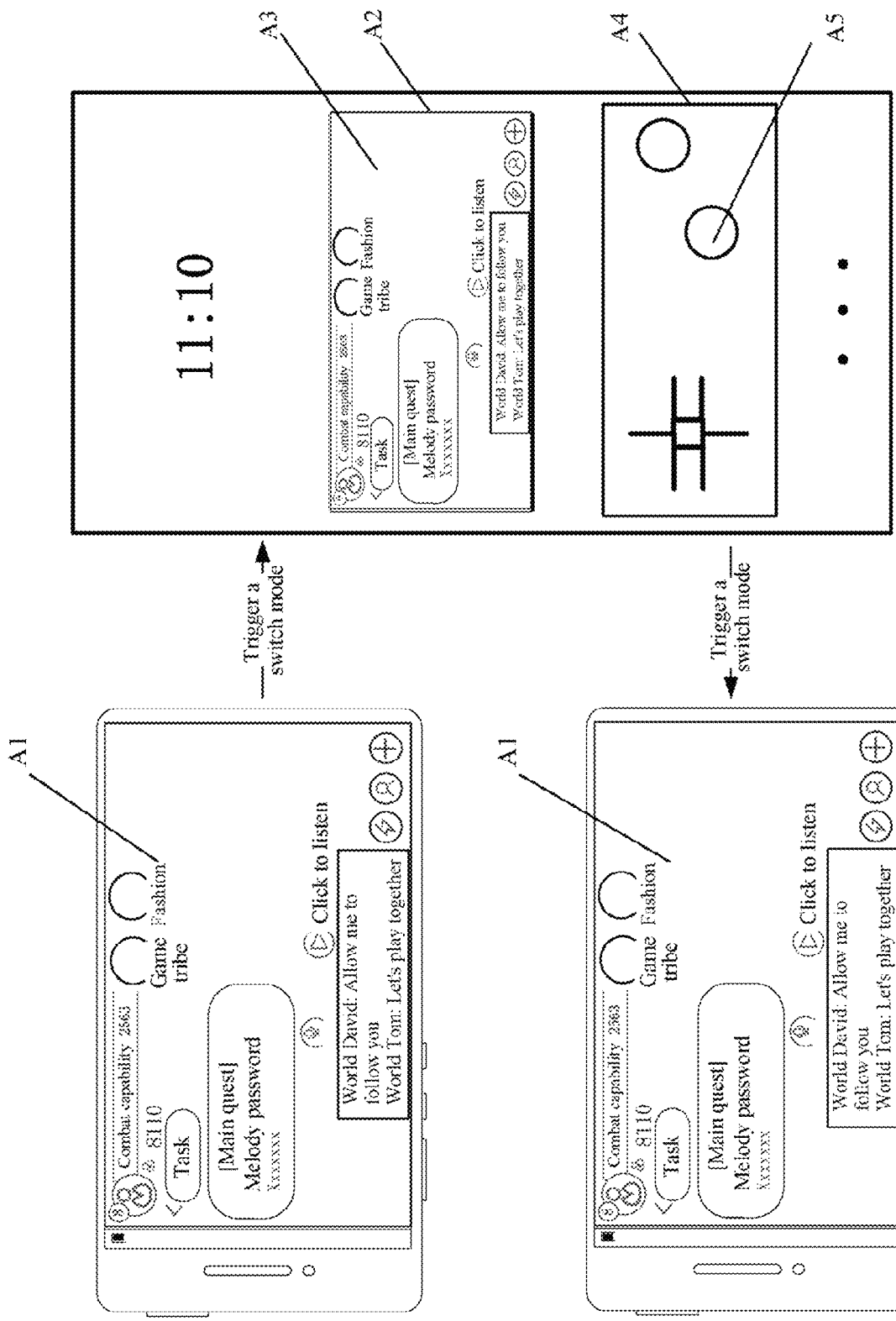
FIG. 1 is a schematic diagram of an environment of a method for controlling interface display according to an embodiment of this application.

Embodiments of this application provide a method and an apparatus for controlling interface display, a device, and a storage medium, to implement an operation of a user on another service on a mobile terminal while continuing a game progress without requiring the user to switch the interface frequently, thereby simplifying the user operation. In addition, a quantity of times of human computer interaction is reduced, and consumption of processing resources of the mobile terminal is reduced.

In the specification, claims, and accompanying drawings of this application, the terms "first", "second", "third", "fourth", and so on (if any) are intended to distinguish between similar objects but do not necessarily indicate a specific order or sequence. It is to be understood that the data termed in such a way are interchangeable in proper circumstances so that the embodiments of this application described herein can be implemented in orders except the order illustrated or described herein. In addition, the terms "include", "corresponding to" and any other variants are intended to cover the non-exclusive inclusion. For example, a process, method, system, product, or device that includes a series of steps or units is not necessarily limited to the expressly listed steps or units, but may include other steps or units not expressly listed or inherent to such a process, method, product, or device.

With the continuous development of the Internet technologies, types of applications are increasingly diverse, and the game application run on a mobile terminal has become one of the most popular applications. To achieve a better game effect, usually, a game interface is displayed on a mobile terminal in full-screen mode, and a user can perform an operation on the game in a display interface of the mobile terminal. However, in consideration of that the mobile terminal provides various services, if the user needs to perform another service during a game, the user needs to suspend the game or switch the game to the background for running, resulting in a relatively cumbersome entire operation process. Based on this, this application provides a method for controlling interface display, to implement an operation of a user on another service on a mobile terminal while continuing the game progress without requiring the user to switch the interface frequently, thereby simplifying the user operation.

For example, using a game application as an example for description, when a user plays a game using a mobile terminal, a game interface is displayed on the mobile terminal in full-screen mode. When the user needs to perform another service during the game, a sub-interface and a touch interface may be provided in a main user interface, the game interface is displayed in the sub-interface after being zoomed out, and at the same time, a virtual key is displayed in the touch interface. The user can control the game application using the virtual key. Based on this, an operation of the user on another service on the mobile terminal can be implemented while the user continues a game progress without requiring the user to switch the interface frequently, which simplifies the user operation, thereby improving the user experience. In addition, a quantity of times of human computer interaction is reduced, and consumption of processing resources of the mobile terminal is reduced.

To help understanding, reference may be made to FIG. 1. FIG. 1 is a schematic diagram of an environment of a method for controlling interface display according to an embodiment of this application. As shown in the figure, a system for controlling game interface display includes a mobile terminal. In addition, applications, such as a game application, are deployed on the mobile terminal. The mobile terminal involved in this application may be a smartphone, a tablet computer, a palmtop computer, or the like, but this application is not limited thereto. In this application, an example in which the game application is a first game application is used. A1 is used for indicating a first game interface in full-screen mode, A2 is used for indicating a first sub-interface, A3 is used for indicating the first game interface displayed in the first sub-interface, A4 is used for indicating a first touch interface, and A5 is used for indicating a first virtual key. In accordance with a determination that the mobile terminal runs the first game application, the first game interface and the first virtual key are displayed in a main user interface in full-screen mode. In accordance with a determination that a switch mode is triggered, the mobile terminal displays the first sub-interface and the first touch interface in the main user interface, so that the first game interface is zoomed out and then displayed in the first sub-interface, and the first virtual key is displayed in the first touch interface. The first virtual key is configured to control the first game application. When a switch-back mode is triggered, the mobile terminal displays the first game interface and the first virtual key in the main user interface in full-screen mode.

Descriptions are provided by using an application to game application interface display as an example. Because that a game engine renders an image to a display interface of the mobile terminal requires presentation using the SurfaceView, and because the SurfaceView has an independent drawing surface, that is, the SurfaceView does not share a same drawing surface with its host window, the user interface (UI) of the SurfaceView can be drawn in an independent thread. In addition, since the SurfaceView does not occupy a main thread resource, the SurfaceView can achieve a complex and efficient UI without causing a failure in timely responding to an operation of a user. In this application, the SurfaceView may be implemented in picture-in-picture mode or floating window mode. The picture-in-picture mode is a picture presentation mode. The picture-in-picture mode refers to displaying a picture on a mobile terminal while simultaneously displaying another picture in a region with a smaller area in the picture. Moreover, the floating window mode means that a movable window is suspended on a surface of an application. It is to be understood that, to use the floating window mode, the mobile terminal may need to be authorized by the system.

Figure 2:
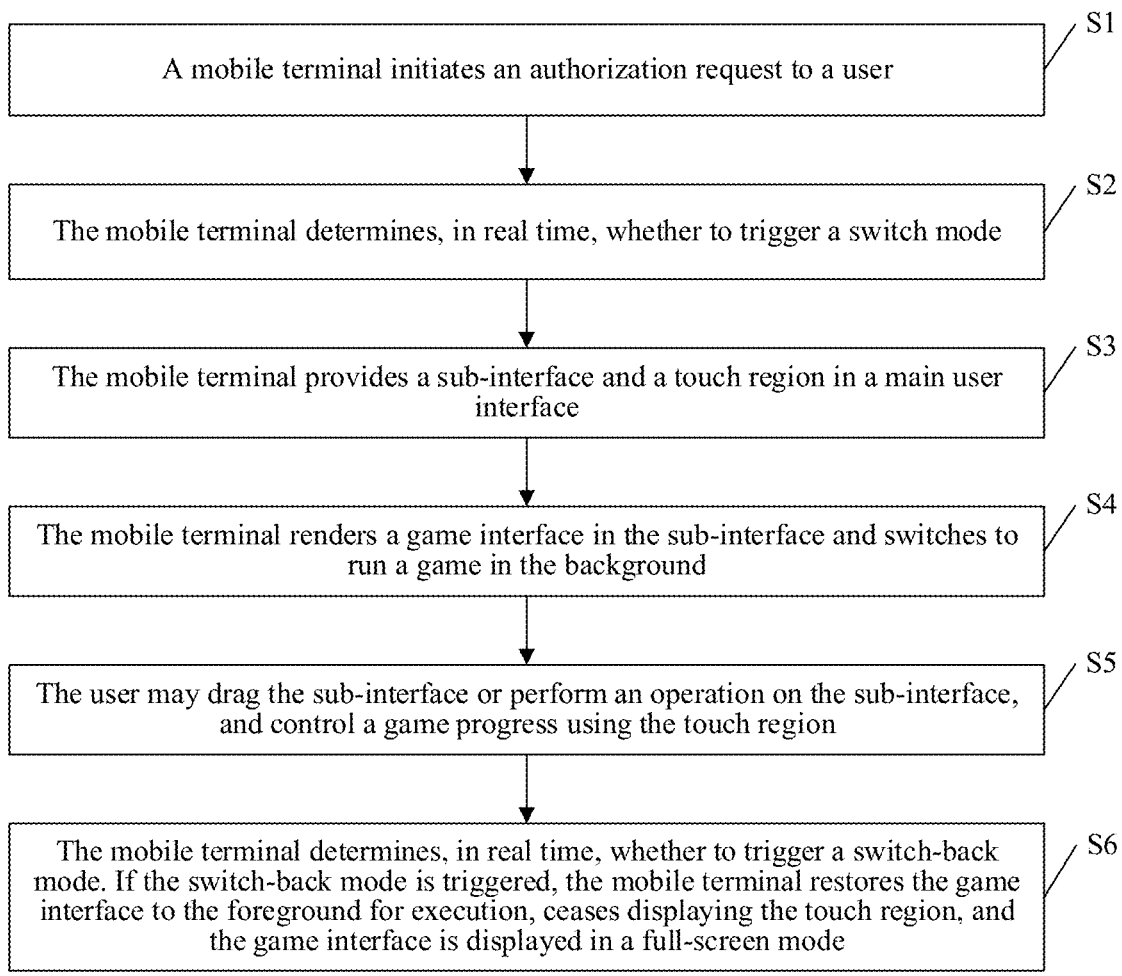
FIG. 2 is a schematic flowchart of a method for controlling interface display according to an embodiment of this application.

Based on the foregoing descriptions, to help understanding, reference may be made to FIG. 2. FIG. 2 is a schematic flowchart of a method for controlling interface display according to an embodiment of this application. As shown in the figure:

Step S1: A mobile terminal initiates an authorization request to a user. A permission included in the authorization request may be a window-top-layer display permission, a front-camera shooting permission, a gravity sensing permission, an incoming call monitoring permission, and the like.

Step S2: The mobile terminal determines, in real time, whether to trigger a switch mode currently, and if the switch mode is triggered, performs step S3. The switch mode includes, but is not limited to, that the user clicks a virtual key in a game interface, the screen rotates, there is an incoming call, a direction of the user's face is the same as a direction of the screen of the smartphone, and the like.

Step S3: The mobile terminal provides a sub-interface and a touch region in a main user interface corresponding thereto. The sub-interface and the touch region may be in floating window mode or picture-in-picture mode, which is not limited herein.

Step S4: The mobile terminal renders a game interface to the sub-interface and switches the game to the background for running.

Step S5: The user may drag the sub-interface or perform an operation on the sub-interface, and control a game progress using the touch region.

Step S6: The mobile terminal determines, in real time, whether to trigger a switch-back mode currently, and if the switch-back mode is triggered, restores the game interface to the foreground for execution, where the touch region disappears, and the game interface is displayed in full-screen mode.

Figure 3:
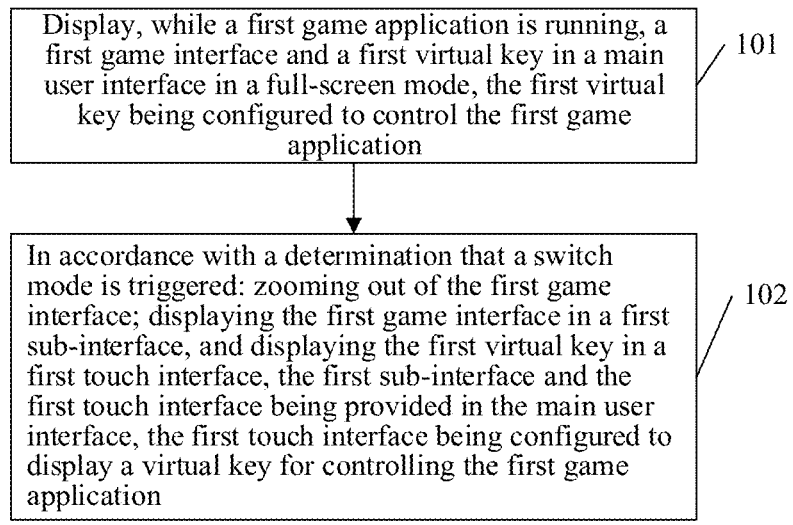
FIG. 3 is a schematic diagram of an embodiment of a method for controlling interface display according to an embodiment of this application.

With reference to the foregoing descriptions, a process of switching a first game interface to a first sub-interface is described below. FIG. 3 is a schematic diagram of an embodiment of a method for controlling interface display according to an embodiment of this application. In the embodiments of this application, an embodiment of controlling interface display includes the following steps:

101: In accordance with a determination that a mobile terminal runs a first game application, the mobile terminal displays a first game interface and a first virtual key in a main user interface in full-screen mode, the first virtual key being configured to control the first game application.

In this embodiment, in accordance with a determination that the first game application is running, the mobile terminal displays the first game interface and the first virtual key in the main user interface in full-screen mode. The full-screen mode may be that the mobile terminal displays the first game interface in the entire displayable region of its screen, or that the mobile terminal displays the first game interface in most of the displayable region of its screen. For example, the mobile terminal displays a status bar (for example, information such as an operator, a time, and a battery level) in a small part of displayable region at the top of the screen, and displays the first game interface in the remaining part of the screen.

Figure 4:
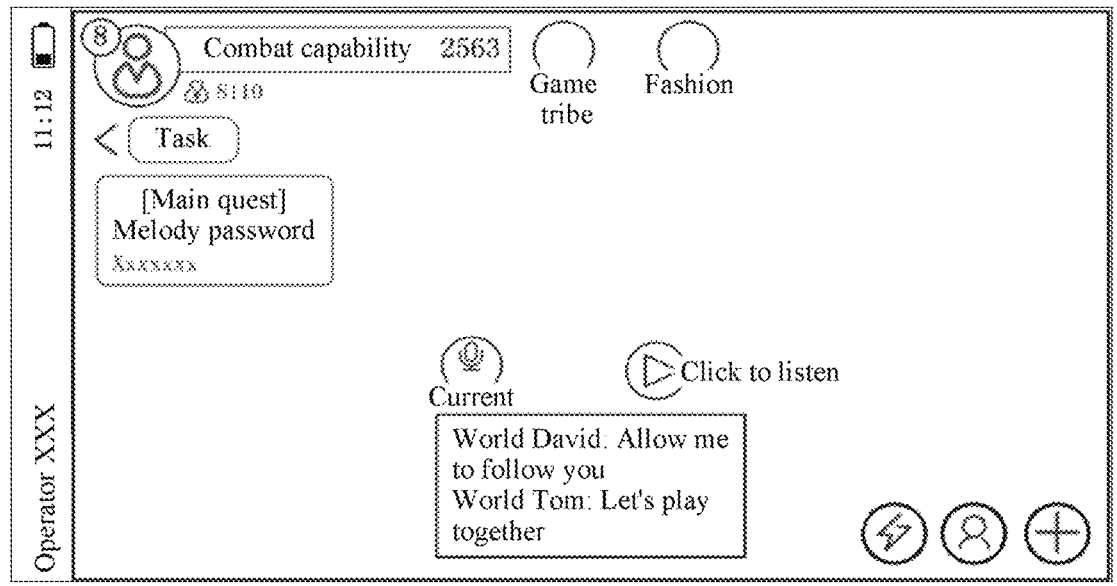
FIG. 4 is a schematic diagram of displaying a first game interface in full-screen mode according to an embodiment of this application.
Figure 4:
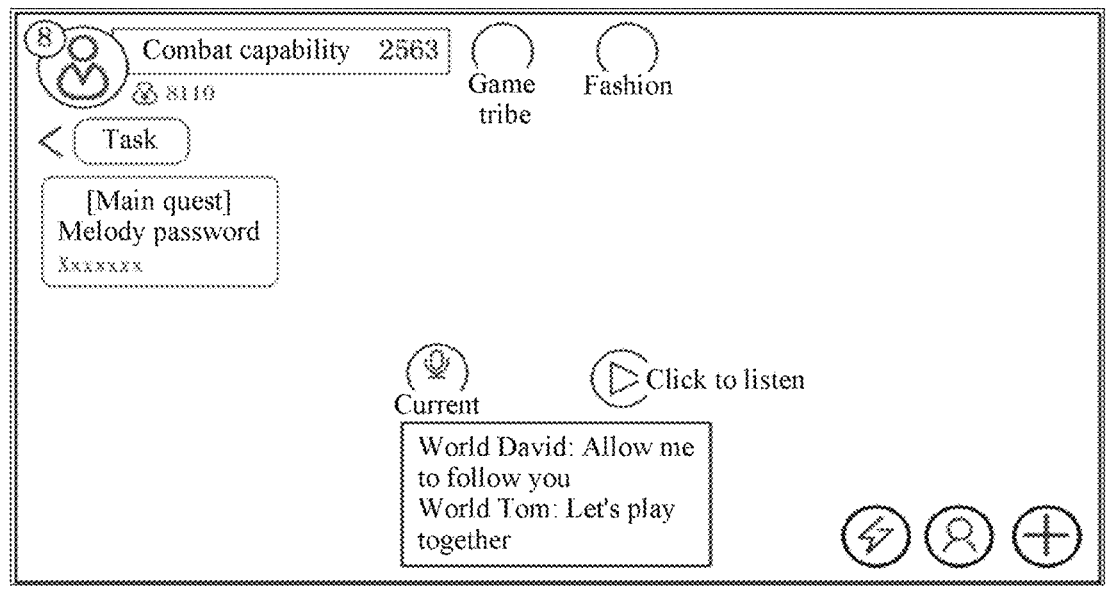

To help understanding, reference may be made to FIG. 4. FIG. 4 is a schematic diagram of displaying a first game interface in full-screen mode according to an embodiment of this application. As shown in the figure, FIG. 4(A) shows displaying the first game interface in most of the displayable region of the screen of the mobile terminal, and FIG. 4 (B) shows displaying the first game interface in the entire displayable region of the screen of the mobile terminal.

102: Display, in accordance with a determination that a switch mode is triggered, the first game interface in a first sub-interface after the first game interface is zoomed out, and display the first virtual key in a first touch interface, the first sub-interface and the first touch interface being displayed in the main user interface in response to accordance with a determination the switch mode being triggered, the first touch interface being configured to display a virtual key for controlling the first game application.

In this embodiment, in accordance with a determination that the switch mode is triggered, the mobile terminal may create the first sub-interface and the first touch interface in the main user interface. The main user interface represents the first user interface that is seen after the mobile terminal is started, usually, the main user interface includes a common application icon, a time, battery level information, operator information, and the like.

Figure 5:
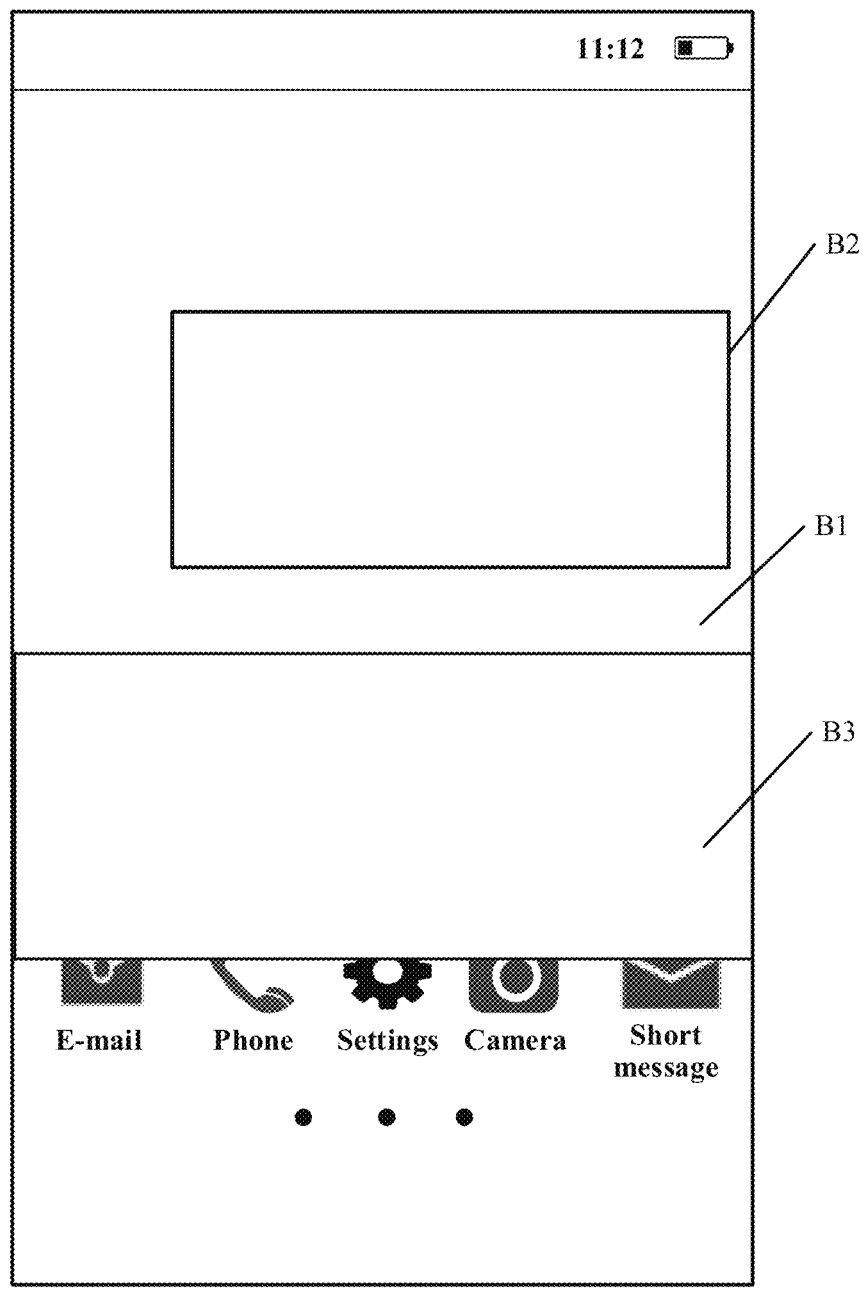
FIG. 5 is a schematic diagram of creating a first sub-interface and a first touch interface according to an embodiment of this application.

To help understanding, reference may be made to FIG. 5. FIG. 5 is a schematic diagram of creating a first sub-interface and a first touch interface according to an embodiment of this application. As shown in the figure, B1 is used for indicating a main user interface, B2 is used for indicating a first sub-interface, and B3 is used for indicating a first touch interface. It is to be understood that, the example of FIG. 5 is merely used for understanding of this solution. The first sub-interface and the first touch interface may also be in a shape of a circle, a triangle, a square, or the like. In addition, the first sub-interface and the first touch interface may also be located at other positions, for example, directly above or directly below the main user interface. The shapes of the first sub-interface and the first touch interface and the display positions thereof in the main user interface may be adjusted according to an actual case. For example, the first touch interface may be located at a display position independent of the first sub-interface in the main user interface, and may also be located at a display position at which the first sub-interface is located, which is not limited herein.

Based on this, the mobile terminal may display the first game interface in the first sub-interface after the first game interface is zoomed out. Because the first virtual key is a virtual key for controlling the first game application, the first virtual key may be displayed in the first touch interface. The first virtual key displayed in the first touch interface and the first virtual key displayed in full-screen mode are both used for controlling the first game application. The first virtual key displayed in the first touch interface and the first virtual key displayed in full-screen mode may be the same or different in terms of the quantity of keys and the shape of the key, which is not limited herein.

Therefore, when the user performs an operation on another service on the mobile terminal, the user may control the first game application by using the first virtual key displayed in the first touch interface, to continue the progress of the first game application.

Figure 6:
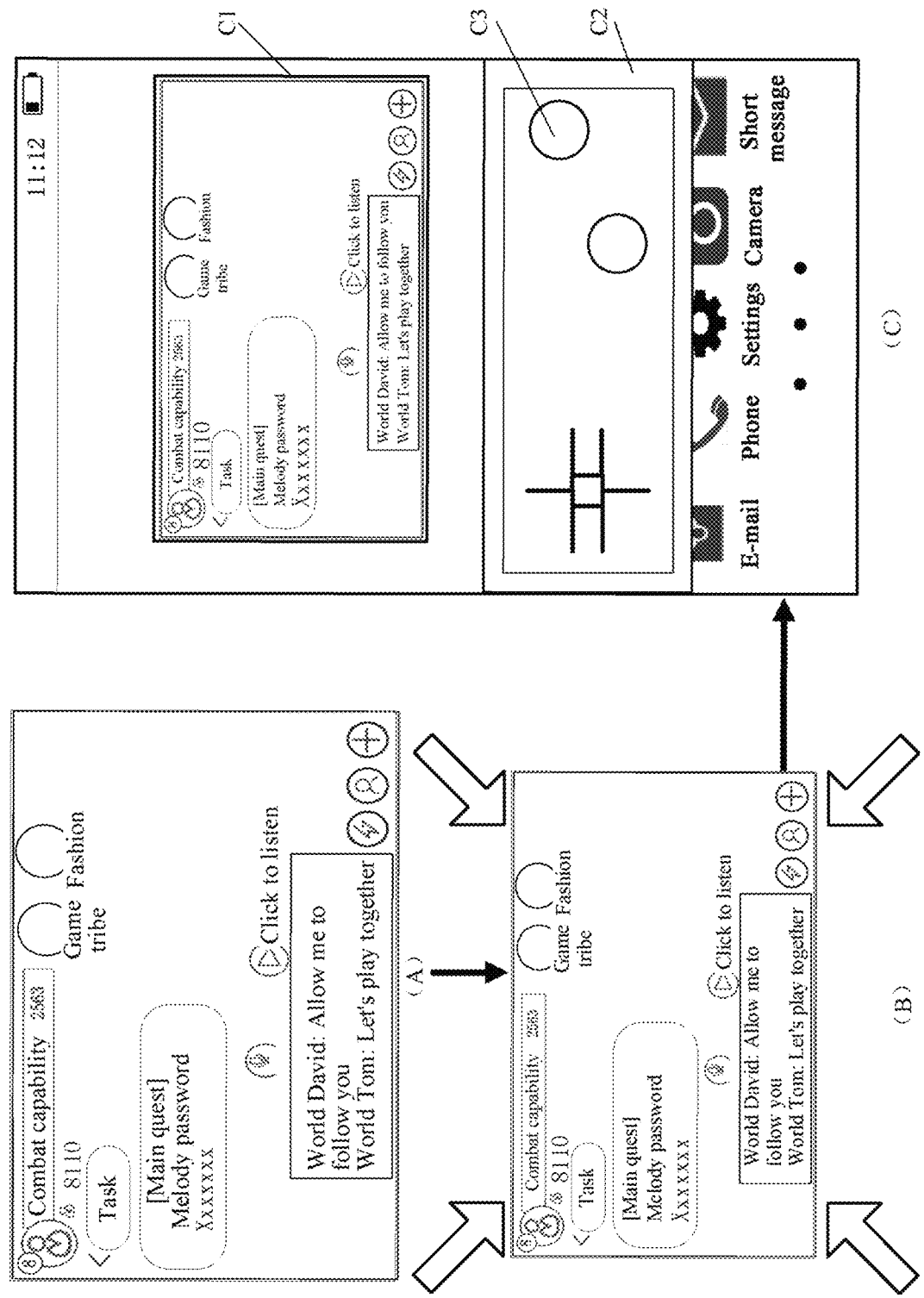
FIG. 6 is a schematic diagram of switching to a main user interface according to an embodiment of this application.

To help understanding, reference may be made to FIG. 6. FIG. 6 is a schematic diagram of switching to a main user interface according to an embodiment of this application. As shown in the figure, FIG. 6(A) shows a first game interface that is not zoomed out, and FIG. 6(B) shows a first game interface that has been zoomed out, and FIG. 6(C) shows a main user interface. C1 is used for indicating a first sub-interface, C2 is used for indicating a first touch interface, and C3 is used for indicating a first virtual key in the first touch interface. The first game interface that has been zoomed out is displayed in the first sub-interface, and the first virtual key is displayed in the first touch interface. It is to be understood that, the example of FIG. 6 is merely used for understanding this solution. The size of the first game interface after being zoomed out needs to be determined according to the size of the first sub-interface. A key shape and a key type of the first virtual key both can be adjusted.

In this embodiment of this application, a method for controlling interface display is provided. In the foregoing manner, a sub-interface configured to display a game interface and a touch interface configured to control a game are provided in a main user interface, to implement an operation of a user on another service on a mobile terminal while continuing a game progress without requiring the user to switch the interface frequently, thereby simplifying the user operation. In addition, a quantity of times of human computer interaction is reduced, and consumption of processing resources of the mobile terminal is reduced.

Figure 7:
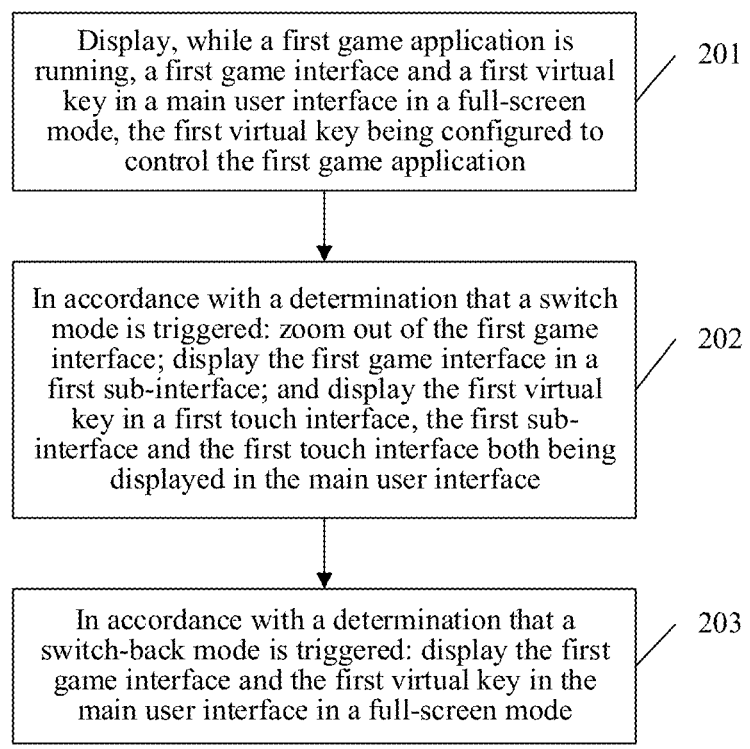
FIG. 7 is a schematic diagram of another embodiment of a method for controlling interface display according to an embodiment of this application.

With reference to the following descriptions, a process of switching back from the first sub-interface to the first game interface is described below. FIG. 7 is a schematic diagram of another embodiment of a method for controlling interface display according to an embodiment of this application. In the embodiments of this application, an embodiment of controlling interface display includes the following steps:

201: In accordance with a determination that a mobile terminal runs a first game application, the mobile terminal displays a first game interface and a first virtual key in a main user interface in full-screen mode, the first virtual key being configured to control the first game application.

202: The mobile terminal displays, in accordance with a determination that a switch mode is triggered, the first game interface in a first sub-interface after the first game interface is zoomed out, and displays the first virtual key in a first touch interface, the first sub-interface and the first touch interface being provided in the main user interface in accordance with a determination that the switch mode is triggered, the first touch interface being configured to display a virtual key for controlling the first game application.

In this embodiment, content described in step 201 to step 202 is similar to the content described in step 101 to step 102, and therefore, details are not described herein again.

203: Display the first game interface and the first virtual key in the main user interface in full-screen mode in accordance with a determination that a switch-back mode is triggered.

In this embodiment, in accordance with a determination that the switch-back mode is triggered, the mobile terminal switches to the full-screen mode to display the first game interface and the first virtual key corresponding to the first game application, and does not display the first touch region separately any more.

Figure 8:
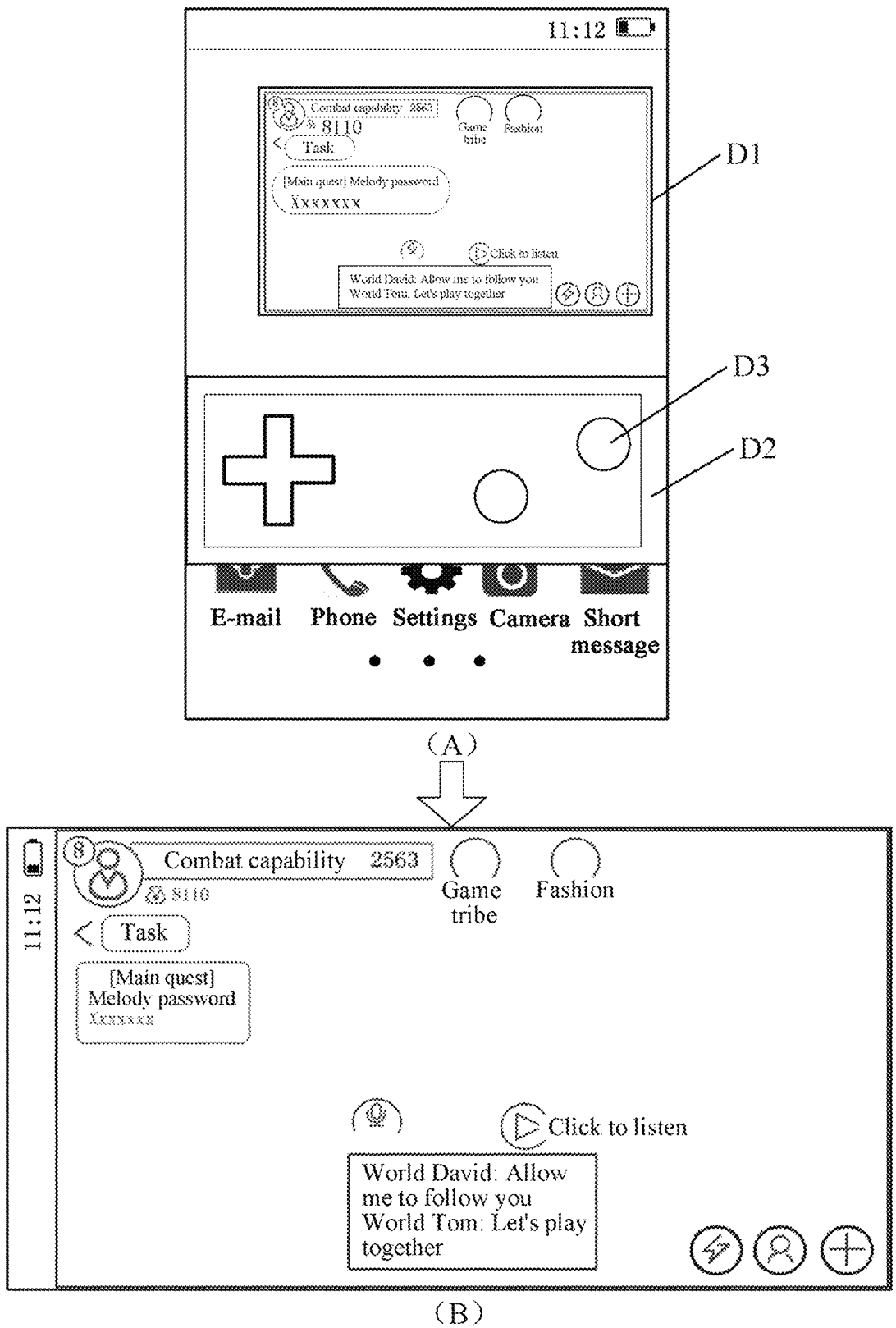
FIG. 8 is a schematic diagram of switching to a first game interface according to an embodiment of this application.

To help understanding, reference may be made to FIG. 8. FIG. 8 is a schematic diagram of switching to a first game interface according to an embodiment of this application. As shown in the figure, FIG. 8(A) shows a main user interface, and FIG. 8(B) shows the first game interface in full-screen mode. D1 is used for indicating a first sub-interface, D2 is used for indicating a first touch interface, and D3 is used for indicating a first virtual key. While performing an operation on another application, the user may also check the game interface of the first game application using the first sub-interface, and control the first game application using the first virtual key displayed in the first touch interface. In accordance with a determination that the user wants to return to the game interface in full-screen mode, the user can change to hold the mobile terminal in landscape screen mode, or click a second virtual key in the first sub-interface, and so on, to switch to the game interface shown in FIG. 8(B).

In this embodiment of this application, a method for controlling interface display is provided. In the foregoing manner, a sub-interface configured to display a game interface and a touch interface configured to control a game are provided in a main user interface, to implement an operation of a user on another service on a mobile terminal while continuing a game progress without requiring the user to switch the interface frequently, thereby simplifying the user operation. Secondly, because during switching back from the sub-interface to the full-screen mode, the game progress can also be continued in the switching process, the user operation is further simplified while satisfying the needs of the user. In addition, a quantity of times of human computer interaction is reduced, and consumption of processing resources of the mobile terminal is reduced.

In a possible implementation, based on the embodiment corresponding to FIG. 3, in another embodiment provided in the embodiments of this application, after the mobile terminal displays a first game interface and a first virtual key in a main user interface in full-screen mode, the following step is further included:

determining, by the mobile terminal, to trigger the switch mode in accordance with a determination that a preset switch operation is triggered, the preset switch operation including at least one of a click operation, a press operation, a slide operation, a double-click operation, or a multi-touch operation.

In this embodiment, a method for determining, through a preset operation, to trigger a switch mode is described. After the mobile terminal displays a first game interface and a first virtual key in a main user interface in full-screen mode, in accordance with a determination that the user needs to perform an operation on another application (for example, a video application, an instant messaging application, a shooting application, or a food ordering application), the user may perform a preset switch operation on the first game interface on the touchscreen. Therefore, when detecting that the touch object performs a preset switch operation for the first game interface on the touchscreen, the mobile terminal determines to trigger the switch mode. The touch object may be a finger or a knuckle of the user or another touchable object, which is not specifically limited herein.

When the switch mode is satisfied, a first sub-interface and a first touch interface may be provided on the main user interface. A manner of creating the first sub-interface and the first touch interface has been described in step 102, and therefore, details are not described herein again. It may be understood that, the preset switch operation includes, but is not limited to, a click operation, a press operation, a slide operation, a double-click operation, a multi-touch operation, and the like.

In this embodiment of this application, a method for determining, through a preset operation, to trigger a switch mode is provided. In the foregoing manner, the user implements an interface switch using a preset switch operation. Therefore, the implementation feasibility of this solution is improved. Secondly, because the preset switch operation may be at least one of various operations, the user may perform an operation according to a requirement, thereby improving the flexibility of this solution.

In a possible implementation, based on the embodiment corresponding to FIG. 3, in another embodiment provided in the embodiments of this application, in accordance with a determination that a preset switch operation is triggered, the mobile terminal determines to trigger a switch mode, which may include following step:

determining, by the mobile terminal, to trigger the switch mode in accordance with a determination that a click operation is triggered for a first virtual button in the first game interface;

or determining, by the mobile terminal, to trigger the switch mode in accordance with a determination that a press operation is triggered for the first game interface, a press time of the press operation being greater than or equal to a first time threshold;

or determining, by the mobile terminal, to trigger the switch mode in accordance with a determination that a slide operation is triggered for the first game interface, a sliding trajectory of the slide operation being generated based on a start position of a touch object and an end position of the touch object;

or determining, by the mobile terminal, to trigger the switch mode in accordance with a determination that a double-click operation is triggered for the first game interface, a double-click time interval of the double-click operation is less than or equal to a second time threshold;

or determining, by the mobile terminal, to trigger the switch mode in accordance with a determination that a multi-touch operation is triggered for the first game interface, the multi-touch operation being generated based on at least two touch points after the at least two touch points are pinched inward.

In this embodiment, various methods for triggering a preset switch operation are described. Different types of preset switch operations are described below with reference to specific examples.

Figure 9:
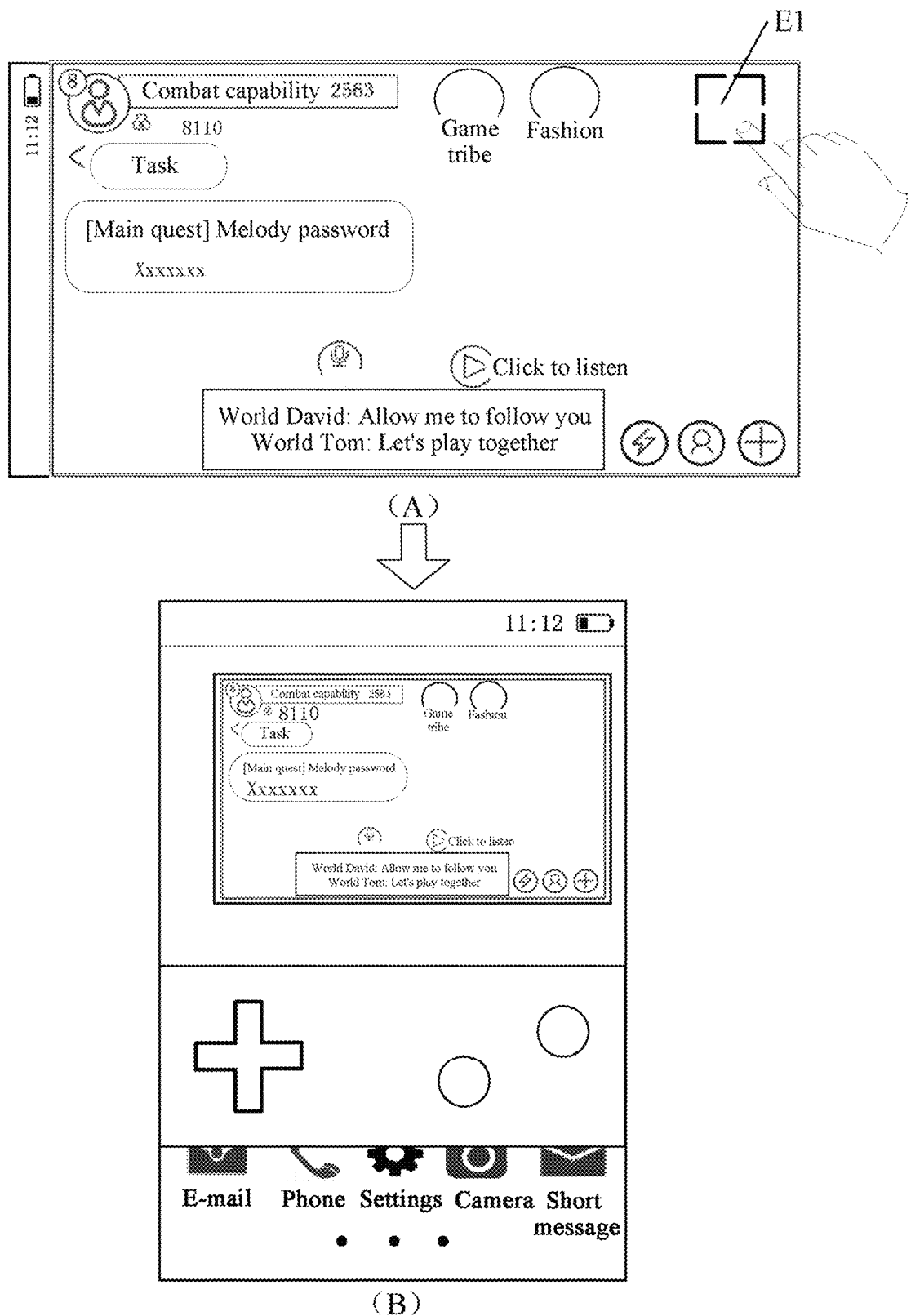
FIG. 9 is a schematic diagram of triggering a click operation for a first game interface according to an embodiment of this application.

The first manner is a click operation. If the user clicks the first virtual key in the first game interface, a click operation is triggered. To help the understanding of the click operation, reference may be made to FIG. 9. FIG. 9 is a schematic diagram of triggering a click operation for a first game interface according to an embodiment of this application. As shown in the figure, FIG. 9(A) shows a first game interface. E1 is used for indicating a first virtual key. When the user clicks the first virtual key, the mobile terminal can detect a click operation for the first virtual key on touchscreen, and determine to trigger a switch mode. Based on this, FIG. 9(B) is entered. FIG. 9(B) shows a main user interface including a first sub-interface and a first touch interface. The example of FIG. 9 is merely used for understanding of this solution. In an actual application, the first virtual key may also be in a shape of a circle, an oval, a triangle, a pentagram, or the like. A position of the first virtual key may be any position located in the first game interface. Based on this, a specific shape and position of the first virtual key can be flexibly determined according to an actual situation.

Figure 10:
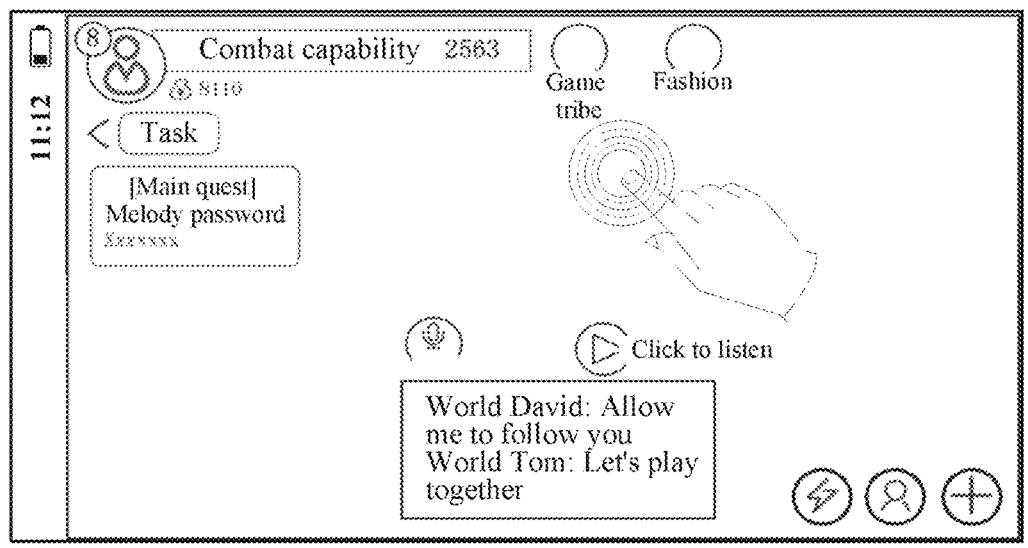
FIG. 10 is a schematic diagram of triggering a press operation for a first game interface according to an embodiment of this application.
Figure 10:
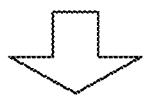
Figure 10:
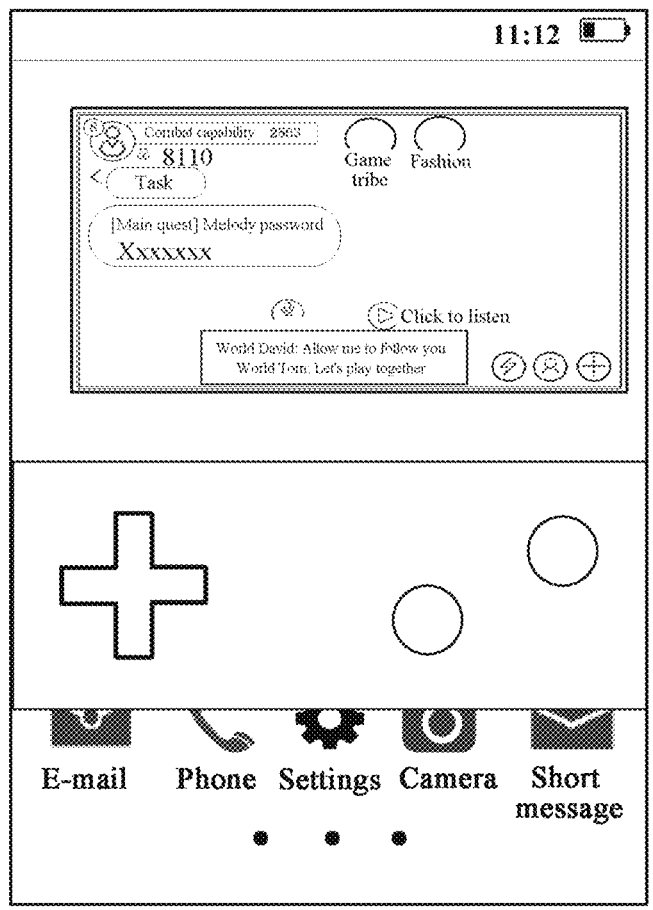

The second manner is a press operation. If a press time during which the user presses the first game interface is greater than or equal to a first time threshold, a press operation is triggered. The first time threshold may be set according to an actual requirement, for example, may be 2 s, 3 s, or the like which is not limited herein. To help the understanding of the press operation, reference may be made to FIG. 10. FIG. 10 is a schematic diagram of triggering a press operation for a first game interface according to an embodiment of this application. As shown in the figure, FIG. 10(A) shows a first game interface. When the user performs a press operation on the touchscreen, and a press time is greater than or equal to a first time threshold, the mobile terminal can determine to trigger a switch mode. Based on this, FIG. 10(B) is entered. FIG. 10(B) shows a main user interface including a first sub-interface and a first touch interface.

Figure 11:
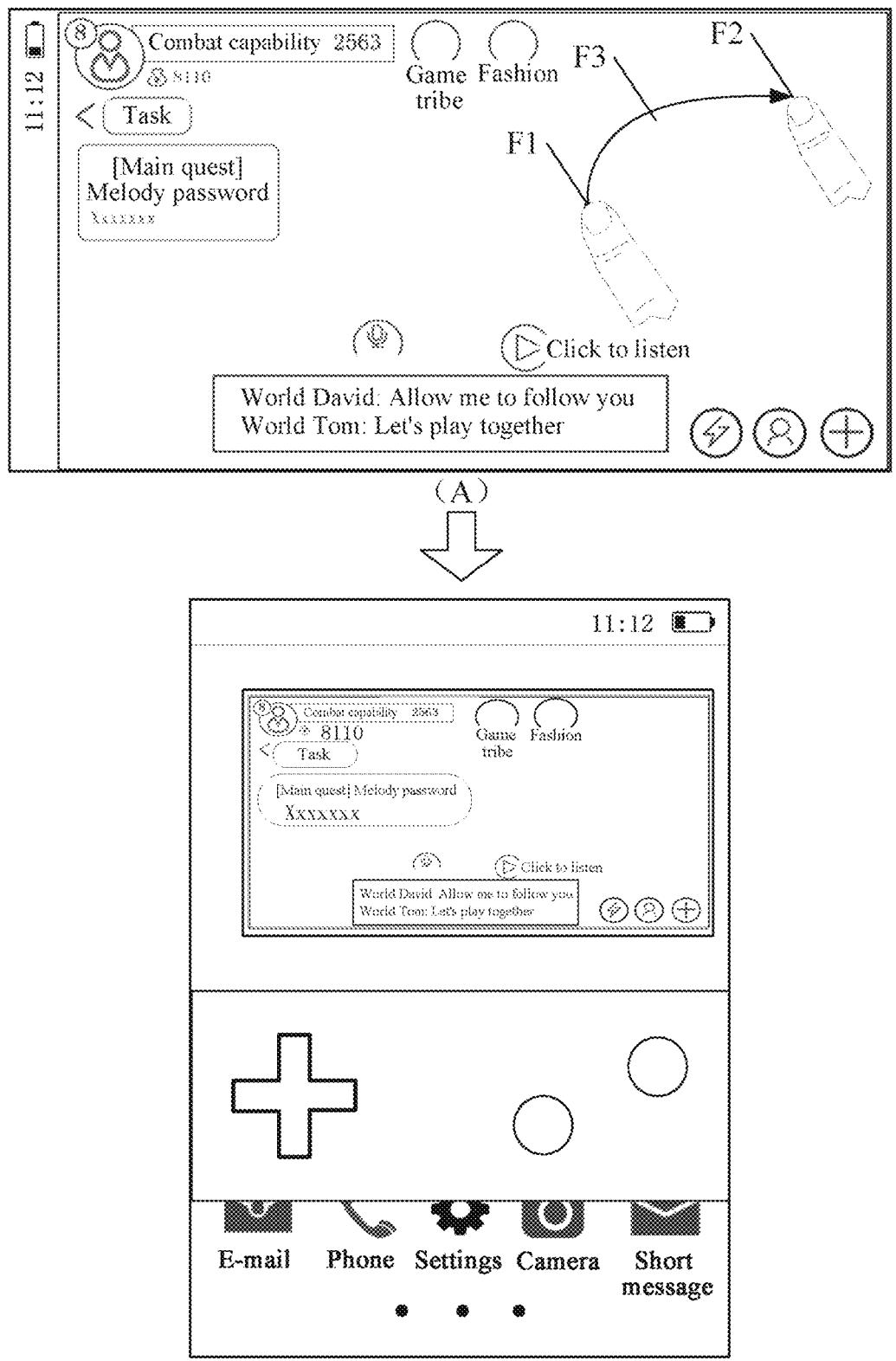
FIG. 11 is a schematic diagram of triggering a slide operation for a first game interface according to an embodiment of this application.

The third manner is a slide operation. If the user performs a slide operation on the first game interface, a sliding trajectory being generated based on a start position of a touch object and an end position of the touch object, a slide operation is triggered. In an actual application, a manner of trigging a slide operation may also be that the mobile terminal starts a camera to shoot a touch object (for example, a hand or a stylus) performing a slide operation in the air. This operation does not require contact with the touchscreen. To help the understanding of the slide operation, descriptions are provided by using an example in which the touch object is a finger. FIG. 11 is a schematic diagram of triggering a slide operation for a first game interface according to an embodiment of this application. As shown in the figure, FIG. 11(A) shows a first game interface. F1 is used for indicating a start position of the finger on the touchscreen, F2 is used for indicating an end position of the finger on the touchscreen, and F3 is used for indicating a sliding trajectory of the slide operation. When the finger of the user slides from the start position to the end position on the touchscreen, and forms the sliding trajectory, the mobile terminal can determine to trigger a switch mode. Based on this, FIG. 11(B) is entered. FIG. 11(B) shows a main user interface including a first sub-interface and a first touch interface.

Figure 12:
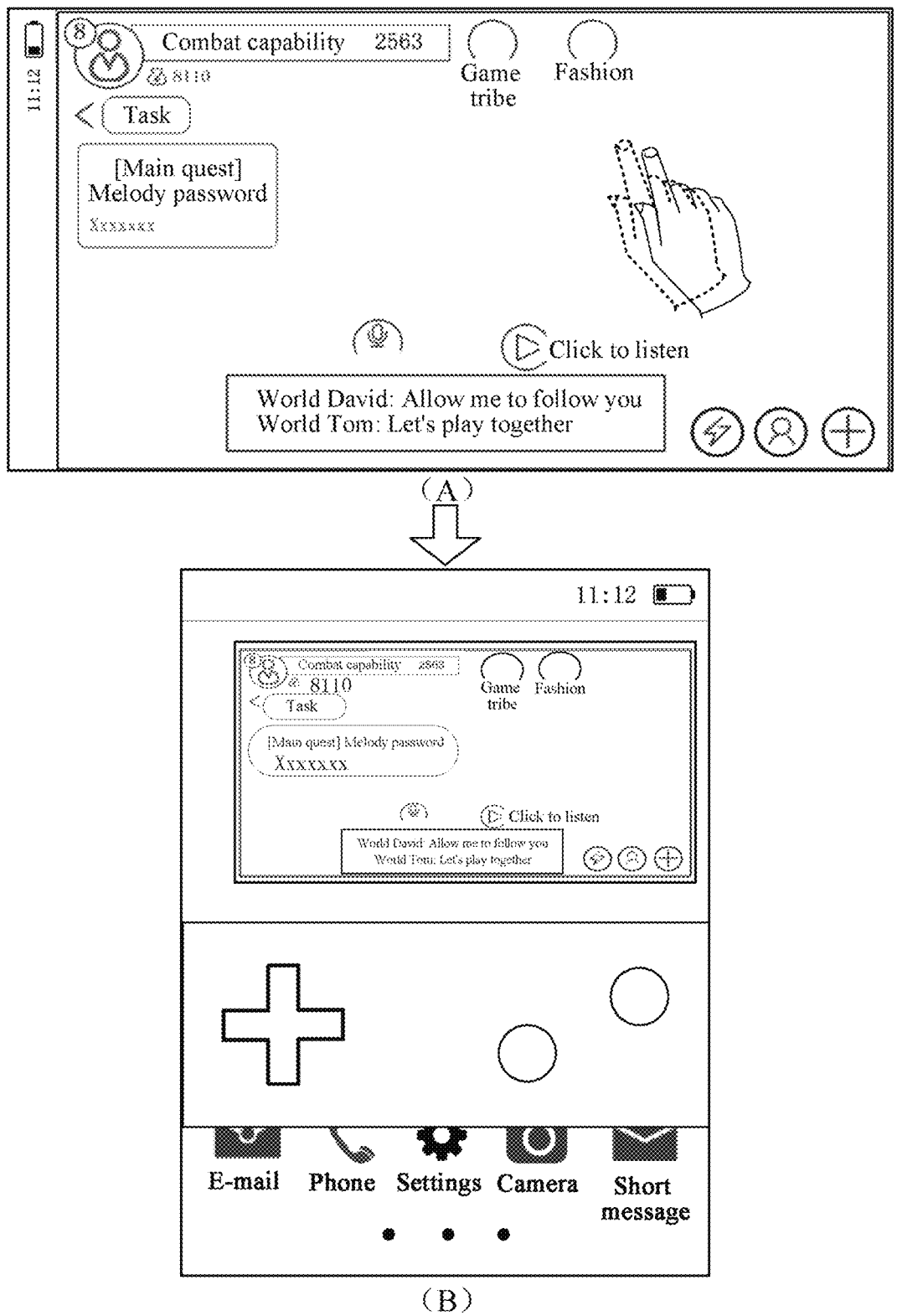
FIG. 12 is a schematic diagram of triggering a double-click operation for a first game interface according to an embodiment of this application.

The fourth manner is a double-click operation. If a time interval between two successive clicks performed by the user on the first game interface is less than or equal to a second time threshold, a double-click operation is triggered. The second time threshold may be set according to an actual requirement, for example, may be 0.5 s, 1 s, or the like, which is not limited herein. To help the understanding of the double-click operation, reference may be made to FIG. 12. FIG. 12 is a schematic diagram of triggering a double-click operation for a first game interface according to an embodiment of this application. As shown in the figure, FIG. 12(A) shows a first game interface. When the user performs a double-click operation on the touchscreen, and a double-click time interval is less than or equal to a second time threshold, the mobile terminal can detect a switch mode. Based on this, FIG. 12(B) is entered. FIG. 12(B) shows a main user interface including a first sub-interface and a first touch interface.

Figure 13:
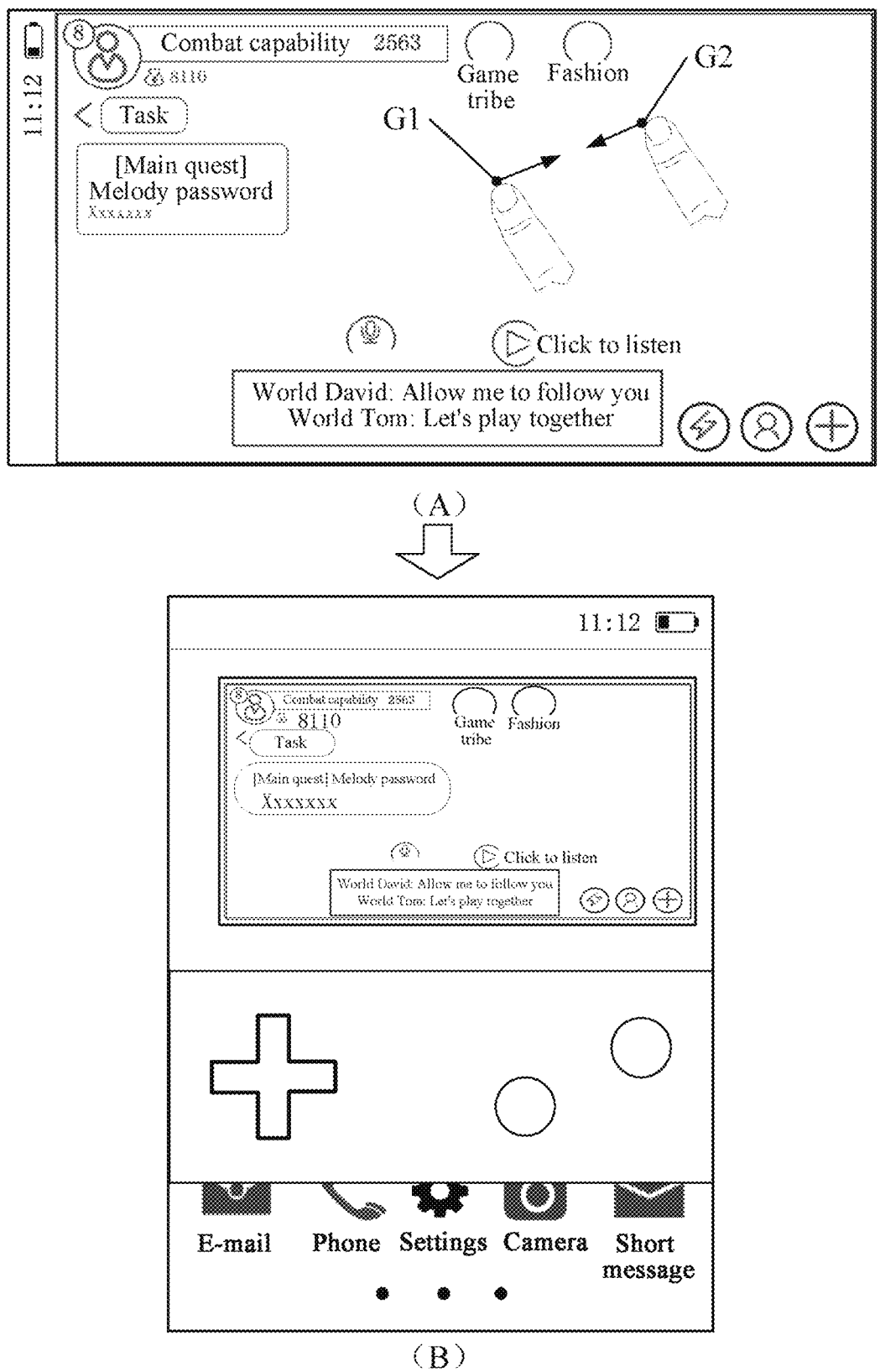
FIG. 13 is a schematic diagram of triggering a multi-touch operation for a first game interface according to an embodiment of this application.

The fifth manner is a multi-touch operation. If the user pinches at least two fingers inward at the same time on the first game interface, a multi-touch operation is triggered. To help the understanding of the multi-touch operation, reference may be made to FIG. 13. FIG. 13 is a schematic diagram of triggering a multi-touch operation for a first game interface according to an embodiment of this application. As shown in the figure, FIG. 13(A) shows a first game interface. G1 is used for indicating a touch point A, and G2 is used for indicating a touch point B. When the user touches the touch point A and the touch point B on the touchscreen, and pinches the fingers inward (for example, in directions of two arrows shown in FIG. 13(A)), the mobile terminal can determine to trigger a switch mode. Based on this, FIG. 13(B) is entered. FIG. 13(B) shows a main user interface including a first sub-interface and a first touch interface.

In the embodiments of this application, various methods for triggering a preset switch operation are provided. In the foregoing manners, the preset switch operation includes a plurality of different operations. Based on this, the user may perform different preset switch operations according to requirements, thereby further improving the flexibility of this solution.

Based on the embodiment corresponding to FIG. 7, in another embodiment provided in the embodiments of this application, after the mobile terminal displays the first game interface in a first sub-interface after the first game interface is zoomed out, and displays the first virtual key in a first touch interface, the following step is further included:

determining, by the mobile terminal, to trigger the switch-back mode in accordance with a determination that a preset switch-back operation is triggered for the first sub-interface, the preset switch-back operation including at least one of a click operation, a press operation, a slide operation, a double-click operation, or a multi-touch operation.

In this embodiment, a method for determining, through a preset operation, to trigger a switch-back mode is described. After the mobile terminal displays the first game interface in a first sub-interface after the first game interface is zoomed out, and displays the first virtual key in a first touch interface, if the user wants to return to the full-screen mode to play the game, a preset switch-back operation may be performed on the first sub-interface on the touchscreen. Therefore, when detecting that the touch object performs a preset switch-back operation for the first sub-interface on the touchscreen, the mobile terminal determines to trigger the switch-back operation. The touch object may be a finger or a knuckle of the user or another touchable object, which is not specifically limited herein.

The first game interface is displayed in full-screen mode in accordance with a determination that a switch-back mode is triggered. The manner of displaying a first game interface in full-screen mode has been described in step 204, and therefore, details are not described herein again. It may be understood that, the preset switch-back operation includes, but is not limited to, a click operation, a press operation, a slide operation, a double-click operation, a multi-touch operation, and the like.

In this embodiment of this application, a method for determining, through a preset operation, to trigger a switch-back mode is provided. In the foregoing manner, the user implements an interface switch using a preset switch-back operation. Therefore, the implementation feasibility of this solution is improved. Secondly, because the preset switch-back operation may be at least one of various operations, the user may perform an operation according to a requirement, thereby improving the flexibility of this solution.

Based on the embodiment corresponding to FIG. 7, in another embodiment provided in the embodiments of this application, in accordance with a determination that a preset switch-back operation for the first sub-interface is triggered, the mobile terminal determines to trigger a switch-back mode, which may include following step:

determining, by the mobile terminal, to trigger the switch-back mode in accordance with a determination that a click operation is triggered for a second virtual button in the first sub-interface;

or determining, by the mobile terminal, to trigger the switch-back mode in accordance with a determination that a press operation is triggered for the first sub-interface, a press time of the press operation being greater than or equal to a first time threshold;

or determining, by the mobile terminal, to trigger the switch-back mode in accordance with a determination that a slide operation is triggered for the first sub-interface, a sliding trajectory of the slide operation being generated based on a start position of a touch object and an end position of the touch object;

or determining, by the mobile terminal, to trigger the switch-back mode in accordance with a determination that a double-click operation is triggered for the first sub-interface, a double-click time interval of the double-click operation is less than or equal to a second time threshold;

or determining, by the mobile terminal, to trigger the switch-back mode in accordance with a determination that a multi-touch operation is triggered for the first sub-interface, the multi-touch operation being generated based on at least two touch points after the at least two touch points are stretched outward.

In this embodiment, various methods for triggering a preset switch-back operation are described. Different types of preset switch-back operations are described below with reference to specific examples.

The first manner is a click operation. The user may perform a click operation for a second virtual key in the first sub-interface on the touchscreen, and the mobile terminal can detect the click operation. The click operation is similar to the example described in FIG. 9, and details are not described herein again.

The second manner is a press operation. The user may perform a press operation on the first sub-interface. In accordance with a determination that a press time of the press operation is greater than or equal to a first time threshold, the mobile terminal can detect the press operation. The first time threshold is set according to an actual requirement, for example, may be 2 s, 3 s, or the like, which is not limited herein. The press operation is similar to the example of FIG. 10, and details are not described herein again.

The third manner is a slide operation. The user may perform a slide operation on the first sub-interface, a sliding trajectory of the slide operation being generated based on a start position of a touch object and an end position of the touch object, and the mobile terminal can detect the slide operation. The specific slide operation is similar to the example of FIG. 11, and details are not described herein again.

The fourth manner is a double-click operation. The user may perform a double-click operation on the first sub-interface, a double-click time interval of the double-click operation being less than or equal to a second time threshold. In this case, the mobile terminal can detect the double-click operation. The second time threshold may be set according to an actual requirement, for example, may be 1 s, 2 s, or the like, which is not limited herein. The specific double-click operation is similar to the example of FIG. 12, and details are not described herein again.

Figure 14:
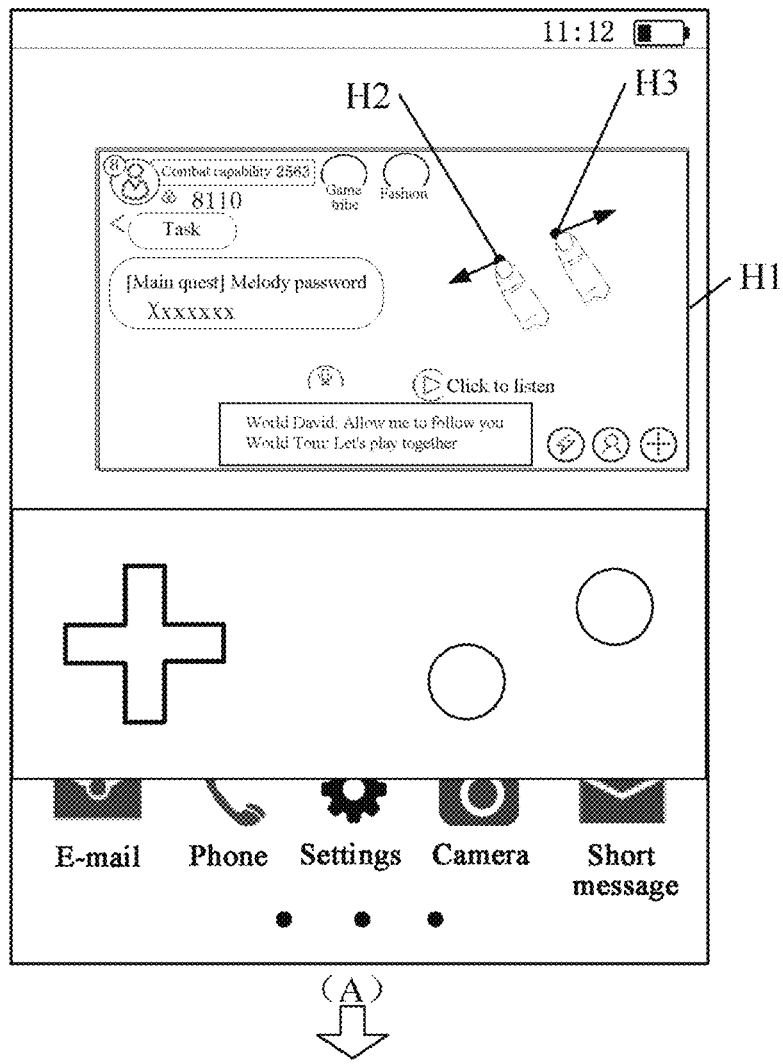
FIG. 14 is a schematic diagram of triggering a multi-touch operation for a first sub-interface according to an embodiment of this application.
Figure 14:
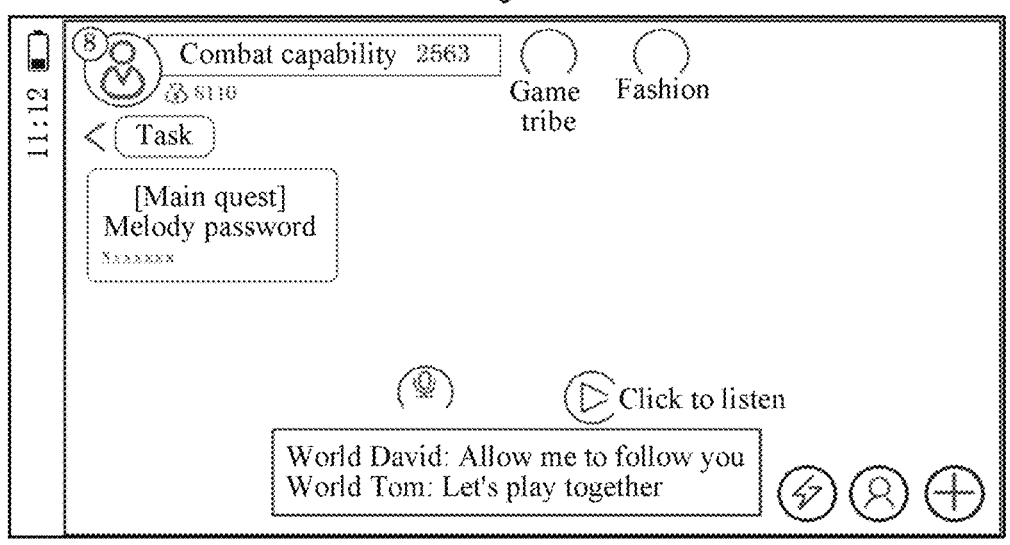

The fifth manner is a multi-touch operation. The user stretches at least two fingers outward at the same time on the first sub-interface, that is, a multi-touch operation is triggered. In this case, the mobile terminal can detect the multi-touch operation. To help the understanding of the multi-touch operation, reference may be made to FIG. 14. FIG. 14 is a schematic diagram of triggering a multi-touch operation for a first sub-interface according to an embodiment of this application. As shown in the figure, FIG. 14(A) shows a main user interface. H1 is used for indicating a first sub-interface, H2 is used for indicating a touch point A, and H3 is used for indicating a touch point B. When the user touches the touch point A and the touch point B on the touchscreen, and pinches the fingers outward (for example, in directions of two arrows shown in FIG. 14(A)), the mobile terminal can determine to trigger a switch-back mode. Based on this, FIG. 14(B) is entered. FIG. 14 (B) shows displaying the first game interface in full-screen mode.

In the embodiments of this application, various methods for triggering a preset switch-back operation are provided. In the foregoing manners, the preset switch-back operation includes a plurality of different operations. Based on this, the user may perform different preset switch-back operations according to requirements, thereby further improving the flexibility of this solution.

Based on the embodiment corresponding to FIG. 3, in another embodiment provided in the embodiments of this application, after the mobile terminal displays a first game interface and a first virtual key in a main user interface in full-screen mode, the following steps are further included:

obtaining, by the mobile terminal, a device usage state through a gravity sensor, the device usage state being used for describing an attitude of the mobile terminal being held; and determining, by the mobile terminal, to trigger the switch mode in accordance with a determination that the device usage state indicates that the mobile terminal is in a portrait-screen usage state.

In this embodiment, a method for determining, based on a device usage state, to trigger a switch mode is described. After the mobile terminal displays the first game interface and the first virtual key in the main user interface in full-screen mode, a device usage state may be obtained through a gravity sensor, the device usage state being used for describing an attitude of the mobile terminal being held. The device usage state mainly includes a portrait-screen usage state and a landscape-screen usage state. Because the state of displaying the first game interface in full-screen mode is usually the landscape-screen usage state, when the mobile terminal is in a portrait-screen usage state, the mobile terminal can determine to trigger the switch mode.

For example, a gravity sensor can determine a state of the mobile terminal by measuring magnitudes of component forces of the gravity of the mobile terminal in two orthogonal directions, that is, obtain a device usage state. In an actual application, the device usage state may also be obtained through a built-in gyroscope in the mobile terminal. Because a rotation axis of a high-speed rotating object tends to be perpendicular to an external force that changes its direction, and when the rotating object is inclined horizontally, the gravity may increase the effect in the inclination direction, while the axis moves toward the perpendicular direction, so that a shaking movement (that is, the precession movement) is generated. Therefore, when a gyro rotation axis of the gyroscope rotates around the horizontal axis, because the gyro rotation axis is subjected to a vertical rotation force because of the rotation of the earth, a rotating body of the gyro generates a precession movement in a direction of the meridian in the horizontal plane, so that the device usage state can be obtained.

Figure 15:
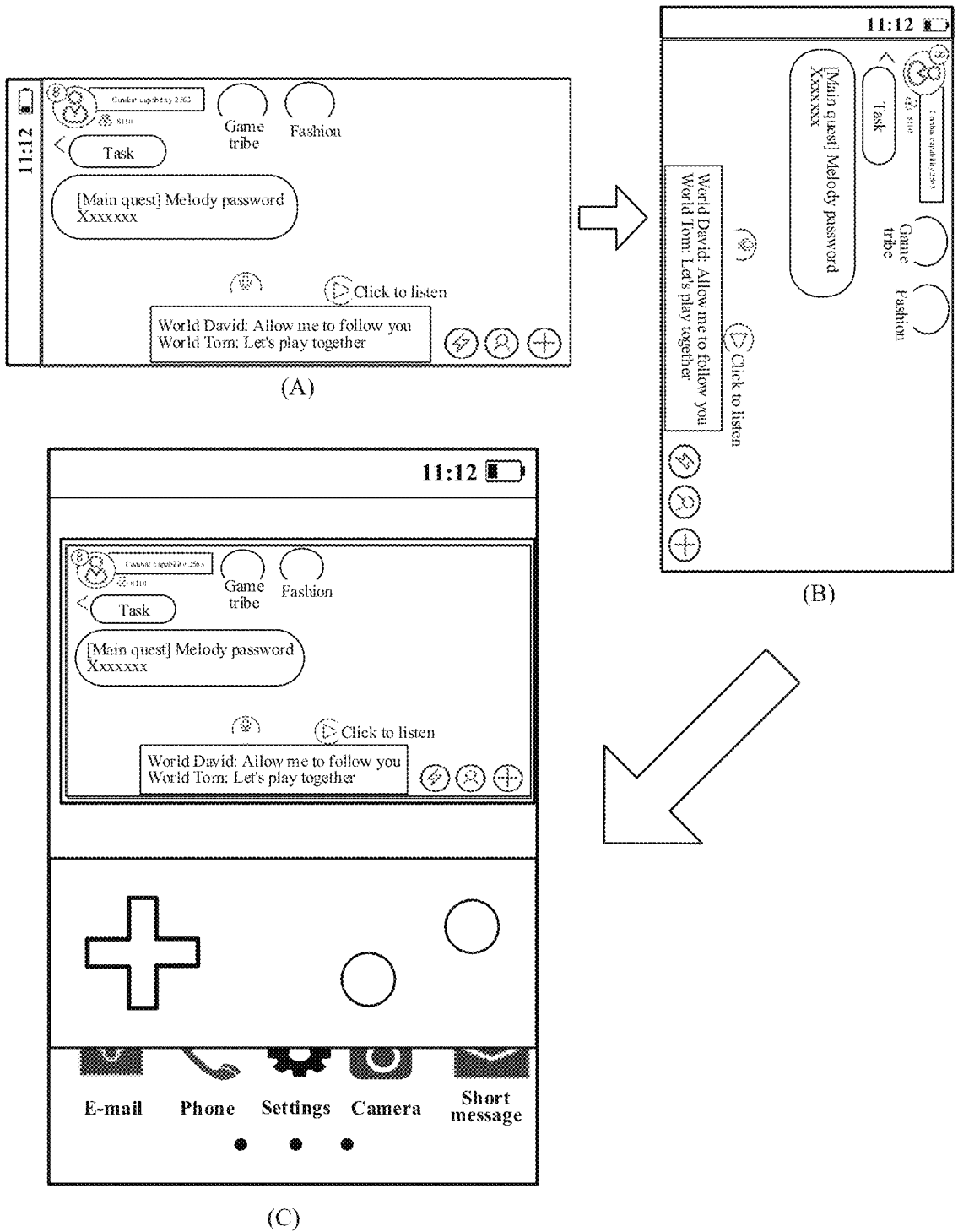
FIG. 15 is a schematic diagram of an embodiment of switching a device usage state according to an embodiment of this application.

To help understanding, reference may be made to FIG. 15. FIG. 15 is a schematic diagram of an embodiment of switching a device usage state according to an embodiment of this application. As shown in the figure, FIG. 15(A) shows a first game interface displayed in full-screen mode in a landscape-screen usage state. When the user switches the mobile terminal from the landscape-screen mode to the portrait-screen mode, as shown in FIG. 15(B), FIG. 15(B) showing a first game interface displayed in full-screen mode in a portrait-screen usage state, the mobile terminal determines to trigger the switch mode. Based on this, FIG. 15(C) is entered. FIG. 15(C) shows a main user interface including a first sub-interface and a first touch interface.

In this embodiment of this application, a method for determining, based on a device usage state, to trigger a switch mode is provided. In the foregoing manner, because when adjusting the device usage state, the user may need to perform an operation on another application or have another demand, determining, by using the device usage state, to rigger the switch mode further clarifies the specific switch mode, thereby improving the feasibility of this solution.

Based on the embodiment corresponding to FIG. 7, in another embodiment provided in the embodiments of this application, after the mobile terminal displays the first game interface in a first sub-interface after the first game interface is zoomed out, and displays the first virtual key in a first touch interface, the following step is further included:

obtaining, by the mobile terminal, a device usage state through a gravity sensor, the device usage state being used for describing an attitude of the mobile terminal being held; and determining, by the mobile terminal, to trigger the switch-back mode in accordance with a determination that the device usage state indicates that the mobile terminal is in a landscape-screen usage state.

In this embodiment, a method for determining, based on a device usage state, to trigger a switch-back mode is described. After the mobile terminal displays the first game interface in a first sub-interface after the first game interface is zoomed out, and displays the first virtual key in a first touch interface, a device usage state may be obtained through a gravity sensor, the device usage state being used for describing an attitude of the mobile terminal being held. The device usage state mainly includes a portrait-screen usage state and a landscape-screen usage state. Because the state of displaying the first sub-interface and the first virtual key is usually the portrait-screen usage state, when the mobile terminal is in a landscape-screen usage state, the mobile terminal can determine to trigger the switch-back mode.

Figure 16:
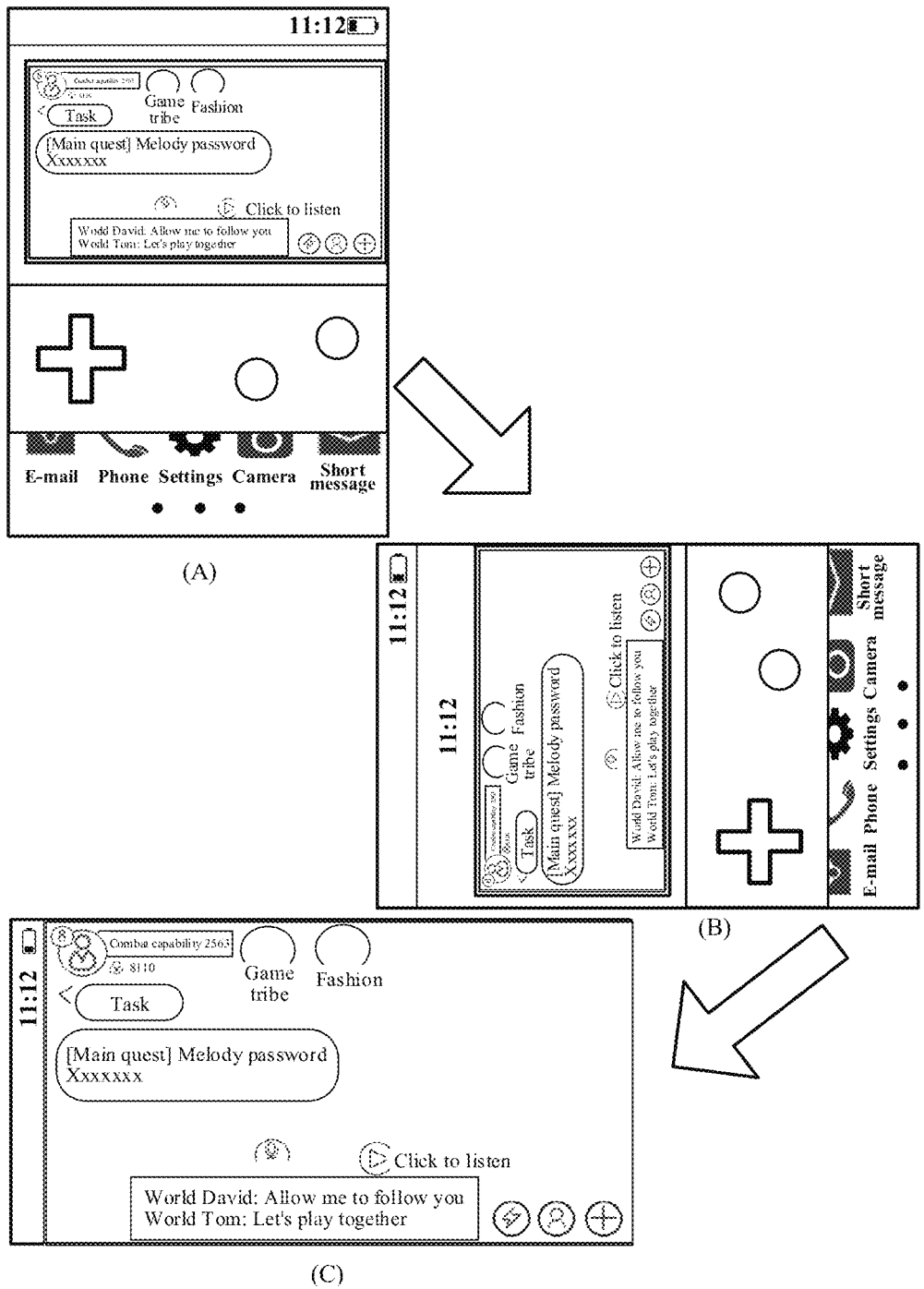
FIG. 16 is a schematic diagram of another embodiment of switching a device usage state according to an embodiment of this application.

To help understanding, reference may be made to FIG. 16. FIG. 16 is a schematic diagram of another embodiment of switching a device usage state according to an embodiment of this application. As shown in the figure, FIG. 16(A) shows a main user interface including a first sub-interface and a first touch interface. When the user switches the mobile terminal from the portrait-screen mode to the landscape-screen mode, as shown in FIG. 16(B), FIG. 16(B) showing a main user interface including a first sub-interface and a first touch interface in a landscape-screen usage state, the mobile terminal determines to trigger the switch-back mode. Based on this, FIG. 16(C) is entered. FIG. 16(C) shows a first game interface displayed in full-screen mode in a landscape-screen usage state.

In this embodiment of this application, a method for determining, based on a device usage state, to trigger a switch-back mode is provided. In the foregoing manner, because when the user adjusts the device usage state, in the landscape-screen usage state, the user usually wants to display the first game interface in full-screen mode, determining, by using the device usage state, to rigger the switch-back mode further clarifies the specific switch-back mode, thereby improving the feasibility of this solution.

Based on the embodiment corresponding to FIG. 3, in another embodiment provided in the embodiments of this application, after the mobile terminal displays a first game interface and a first virtual key in a main user interface in full-screen mode, the following steps are further included:

obtaining, by the mobile terminal, a face image through a front-facing camera;

determining, by the mobile terminal according to the face image, left eye coordinates corresponding to the left eye and right eye coordinates corresponding to the right eye;

determining, by the mobile terminal, a two-eye coordinate connecting line according to the left eye coordinates and the right eye coordinates; and determining, by the mobile terminal, to trigger the switch mode in accordance with a determination that an angle between the two-eye coordinate connecting line and a horizontal direction of the mobile terminal is less than or equal to an angle threshold, the horizontal direction of the mobile terminal representing a horizontal direction of the mobile terminal in a portrait-screen usage state.

In this embodiment, a method for triggering a switch mode based on a facial recognition situation is described. After displaying the first game interface and the first virtual key in the main user interface in full-screen mode, the mobile terminal may further obtain a face image through a front-facing camera, determines, according to the face image, left eye coordinates corresponding to the left eye and right eye coordinates corresponding to the right eye, and then, generates a two-eye coordinate connecting line according to the left eye coordinates and the right eye coordinates. The mobile terminal determines to trigger the switch mode in accordance with a determination that an angle between the two-eye coordinate connecting line and a horizontal direction of the mobile terminal is less than or equal to an angle threshold. The horizontal direction of the mobile terminal represents a horizontal direction of the mobile terminal in a portrait-screen usage state. The angle threshold may be set according to an actual requirement, for example, may be 30°, and in an actual application, the angle threshold may also be set to another angle such as 45° or 20°, which are not limited herein.

Figure 17:
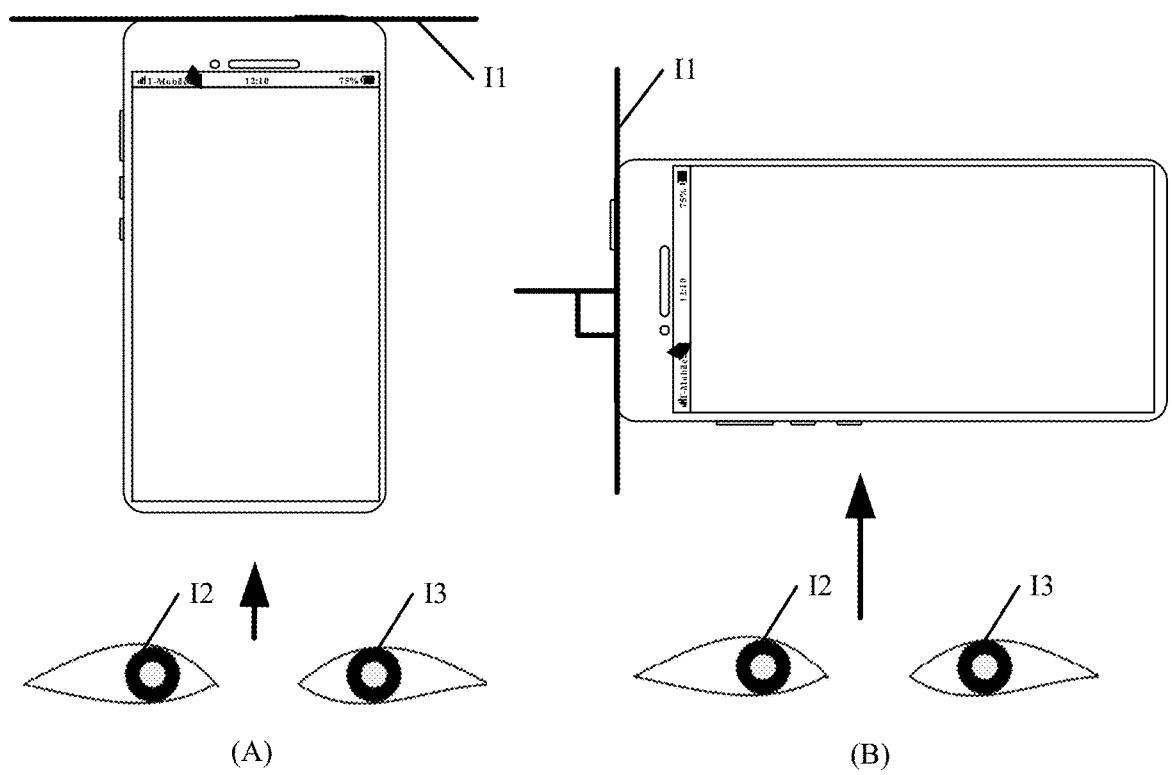
FIG. 17 is a schematic diagram of an angle between a two-eye coordinate connecting line and a horizontal direction of a mobile terminal according to an embodiment of this application.

To help understanding, reference may be made to FIG. 17. FIG. 17 is a schematic diagram of an angle between a two-eye coordinate connecting line and a horizontal direction of a mobile terminal according to an embodiment of this application. As shown in the figure, FIG. 17(A) shows a mobile terminal in a portrait-screen usage state, and FIG. 17(B) shows a mobile terminal in a landscape-screen usage state. I1 is used for indicating a horizontal direction of the mobile terminal, I2 is used for indicating the left eye, and I3 is used for indicating the right eye. As can be seen from FIG. 17(A), the connecting line between the left eye and the right eye is parallel to the horizontal direction of the mobile terminal, that is, an angle between the two-eye coordinate connecting line between the left eye coordinates corresponding to the left eye and the right eye coordinates corresponding to the right eye and the horizontal direction of the mobile terminal is 0°. As can be seen from FIG. 17(B), the connecting line between the left eye and the right eye is perpendicular to the horizontal direction of the mobile terminal, that is, an angle between the two-eye coordinate connecting line between the left eye coordinates corresponding to the left eye and the right eye coordinates corresponding to the right eye and the horizontal direction of the mobile terminal is 90°.

Figure 18:
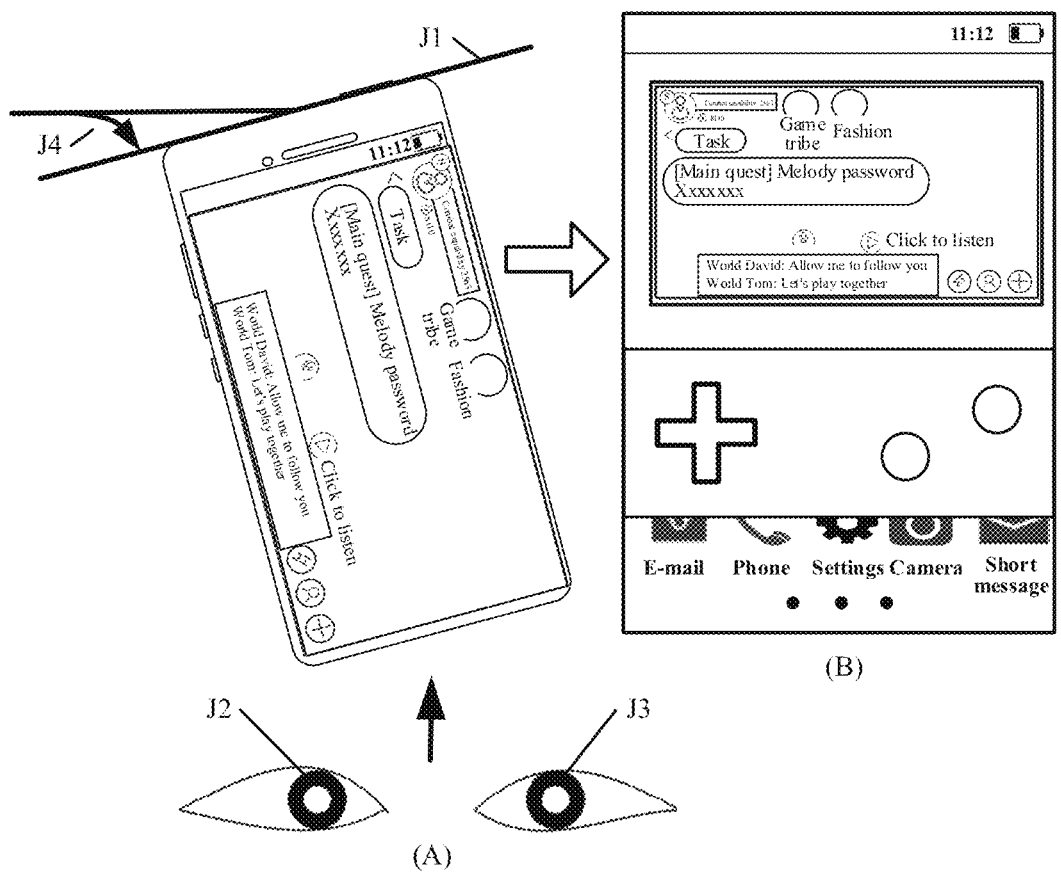
FIG. 18 is a schematic diagram of implementing an interface switch based on facial recognition according to an embodiment of this application.

Descriptions are provided by using an example in which the angle threshold is 30°. FIG. 18 is a schematic diagram of implementing an interface switch based on facial recognition according to an embodiment of this application. As shown in the figure, FIG. 18(A) shows a mobile terminal. J1 is used for indicating a horizontal direction of the mobile terminal, J2 is used for indicating the left eye, J3 is used for indicating the right eye, and J4 is used for indicating an angle between a two-eye coordinate connecting line and the horizontal direction of the mobile terminal. As can be seen from FIG. 18(A), there is an angle between the two-eye coordinate connecting line between the left eye coordinates and the right eye coordinates and the horizontal direction of the mobile terminal. If the angle is 20°, then the angle is less than the angle threshold 30°. Therefore, the switch mode is satisfied, so that FIG. 18(B) is obtained. FIG. 18(B) shows a main user interface including a first sub-interface and a first touch interface.

In this embodiment of this application, a method for triggering a switch mode based on a facial recognition situation is provided. In the foregoing manner, the left eye coordinates and the right eye coordinates are determined based on the face image, and further, the two-eye coordinate connecting line is determined. Determining, according to a relationship of the angle between the two-eye coordinate connecting line and the horizontal direction of the mobile terminal, whether to trigger the switch mode clarifies the specific switch mode without requiring the user to perform an active operation. Whether to trigger the switch mode can be determined by only obtaining the face image, which simplifies the user operation.

Based on the embodiment corresponding to FIG. 7, in another embodiment provided in the embodiments of this application, after the mobile terminal displays the first game interface in a first sub-interface after the first game interface is zoomed out, and displays the first virtual key in a first touch interface, the following step is further included:
  obtaining, by the mobile terminal, a face image through a front-facing camera;
  determining, by the mobile terminal according to the face image, left eye coordinates corresponding to the left eye and right eye coordinates corresponding to the right eye;
  determining, by the mobile terminal, a two-eye coordinate connecting line according to the left eye coordinates and the right eye coordinates; and
  determining, by the mobile terminal, to trigger the switch-back mode in accordance with a determination that an angle between the two-eye coordinate connecting line and a horizontal direction of the mobile terminal is greater than an angle threshold, the horizontal direction of the mobile terminal representing a horizontal direction of the mobile terminal in a portrait-screen usage state.

In this embodiment, a method for determining, based on a facial recognition situation, to trigger a switch-back mode is described. After displaying the first game interface in a first sub-interface after the first game interface is zoomed out, and displaying the first virtual key in a first touch interface, the mobile terminal may further obtain a face image through a front-facing camera, determines, according to the face image, left eye coordinates corresponding to the left eye and right eye coordinates corresponding to the right eye, and then, generates a two-eye coordinate connecting line according to the left eye coordinates and the right eye coordinates. The mobile terminal determines to trigger the switch-back mode in accordance with a determination that an angle between the two-eye coordinate connecting line and a horizontal direction of the mobile terminal is greater than an angle threshold. The horizontal direction of the mobile terminal represents a horizontal direction of the mobile terminal in a portrait-screen usage state. The angle threshold may be set according to an actual requirement, for example, may be 30°, and in an actual application, the angle threshold may also be set to another angle such as 45° or 20°, which are not limited herein.

Figure 19:
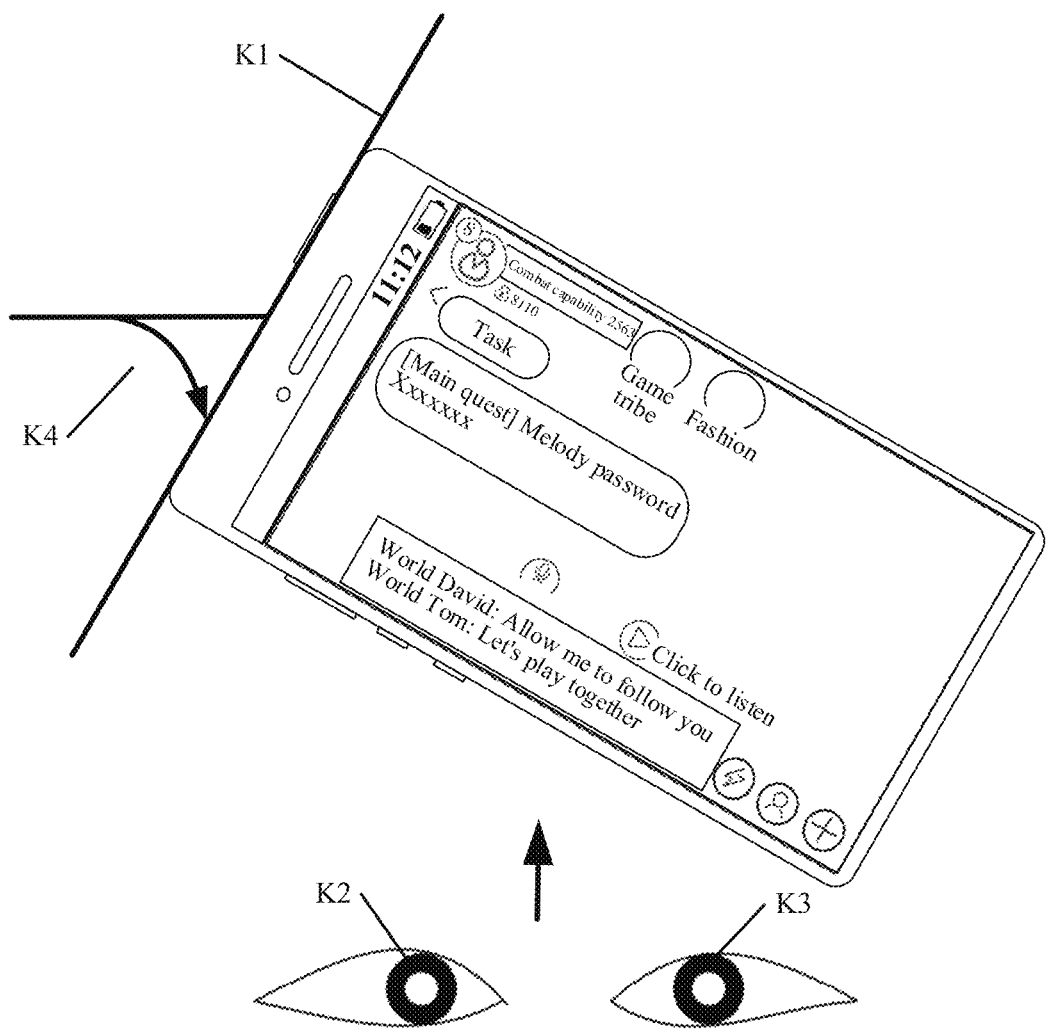
FIG. 19 is a schematic diagram of implementing an interface switch back based on facial recognition according to an embodiment of this application.
Figure 19:
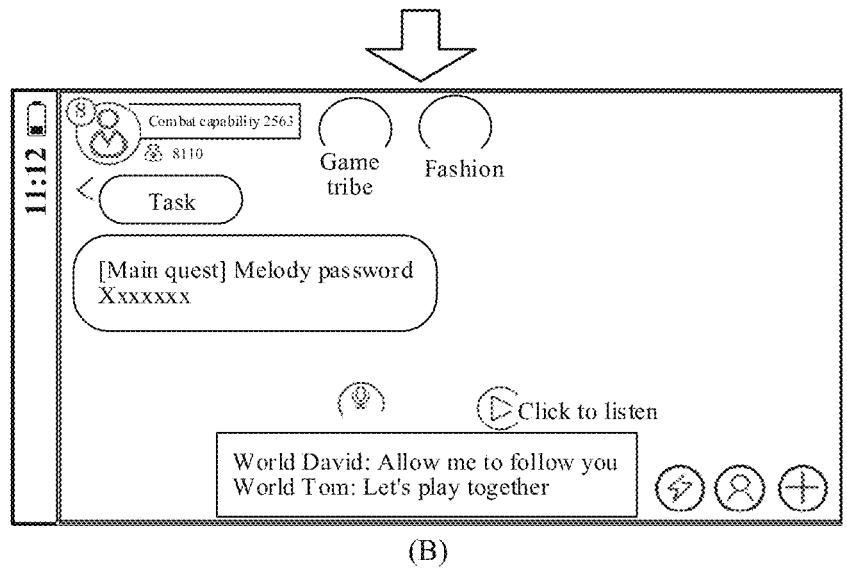

To help understanding, descriptions are provided by using an example in which the angle threshold is 30°. FIG. 19 is a schematic diagram of implementing an interface switch back based on facial recognition according to an embodiment of this application. As shown in the figure, FIG. 19(A) shows a mobile terminal. K1 is used for indicating a horizontal direction of the mobile terminal, K2 is used for indicating the left eye, K3 is used for indicating the right eye, and K4 is used for indicating an angle between a two-eye coordinate connecting line and the horizontal direction of the mobile terminal. As can be seen from FIG. 19(A), there is an angle between the two-eye coordinate connecting line between the left eye coordinates and the right eye coordinates and the horizontal direction of the mobile terminal. If the angle is 45°, then the angle is greater than the angle threshold 30°. Therefore, the switch-back mode is satisfied, so that FIG. 19(B) is obtained. FIG. 19(B) shows a first game interface displayed in full-screen mode.

In this embodiment of this application, a method for determining, based on a facial recognition situation, to trigger a switch-back mode is provided. In the foregoing manner, the left eye coordinates and the right eye coordinates are determined based on the face image, and further, the two-eye coordinate connecting line is determined. Determining, according to a relationship of the angle between the two-eye coordinate connecting line and the horizontal direction of the mobile terminal, whether to trigger the switch-back mode does not require the user to perform an active operation. Whether to trigger the switch-back mode can be determined by only obtaining the face image, which simplifies the user operation.

Based on the embodiment corresponding to FIG. 3, in another embodiment provided in the embodiments of this application, after the mobile terminal displays a first game interface and a first virtual key in a main user interface in full-screen mode, the following steps are further included:
  monitoring, by the mobile terminal, an incoming call reminder; and determining, by the mobile terminal, to trigger the switch mode in accordance with a determination that an answering instruction for the incoming call reminder is triggered.

In this embodiment, a method for determining, based on an incoming call situation, to trigger a switch mode is described. The mobile terminal may monitor an incoming call reminder in real time. When there is an incoming call reminder, if the user chooses to answer the incoming call, the mobile terminal may detect an answering instruction for the incoming call reminder, and therefore, determine to trigger the switch mode. An answering operation through which the user chooses to answer the incoming call may be an operation of clicking an answer button.

Figure 20:
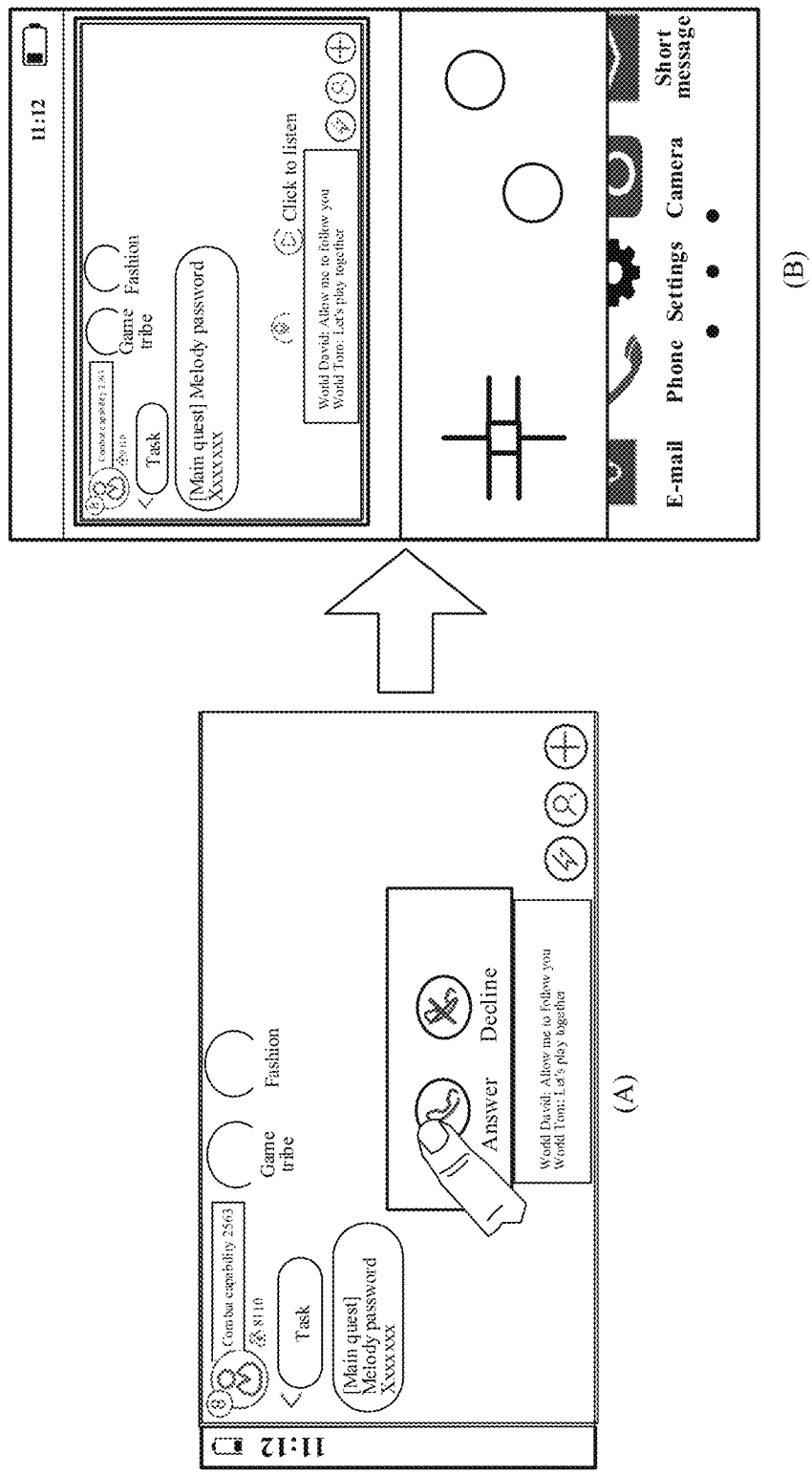
FIG. 20 is a schematic diagram of implementing an interface switch based on an incoming call reminder according to an embodiment of this application.

To help the understanding, reference may be made to FIG. 20. FIG. 20 is a schematic diagram of implementing an interface switch based on an incoming call reminder according to an embodiment of this application. As shown in the figure, FIG. 20(A) shows a first game interface displayed in full-screen mode. When the mobile terminal displays the incoming call reminder, if the user chooses to answer the incoming call, an answer button can be clicked. Therefore, when detecting an answering instruction for the incoming call reminder, the mobile terminal can determine to trigger the switch mode. Based on this, FIG. 20(B) is entered. FIG. 20(B) shows a main user interface including a first sub-interface and a first touch interface.

In this embodiment of this application, a method for determining, based on an incoming call situation, to trigger a switch mode is provided. In the foregoing manner, if the user chooses to answer the incoming call, the interface is automatically switched, thereby simplifying the user operation and improving the feasibility of this solution.

Based on the embodiment corresponding to FIG. 3, in another embodiment provided in the embodiments of this application, after the mobile terminal displays a first game interface and a first virtual key in a main user interface in full-screen mode, the following steps are further included:
  obtaining, by the mobile terminal, to-be-detected voice through a microphone; and
  determining, by the mobile terminal in accordance with a determination that to-be-detected voice successfully matches first preset voice, to trigger a switch mode.

In this embodiment, a method for determining, based on voice, to trigger a switch mode is described. After displaying the first game interface and the first virtual key in the main user interface in full-screen mode, the mobile terminal may further obtain to-be-detected voice through a microphone in real time, and determines, in accordance with a determination that the to-be-detected voice successfully matches first preset voice, to trigger a switch mode. For example, assuming that the first preset voice is "Switch the interface", in accordance with a determination that the user says "Switch the interface" (that is, "Switch the interface" is to-be-detected voice) to the microphone, the mobile terminal matches the to-be-detected voice with the first preset voice, and determines, in accordance with a determination that the matching succeeds, to trigger the switch mode. It is to be understood that, the foregoing example is merely for understanding of this solution. The first preset voice may also be set according to an actual selection situation.

In this embodiment of this application, a method for determining, based on voice, to trigger a switch mode is provided. In the foregoing manner, the user may switch the interface through voice, thereby simplifying the user operation and increasing the application flexibility of the solution.

Based on the embodiment corresponding to FIG. 7, in another embodiment provided in the embodiments of this application, after the mobile terminal displays the first game interface in a first sub-interface after the first game interface is zoomed out, and displays the first virtual key in a first touch interface, the following step is further included:
  obtaining, by the mobile terminal, to-be-detected voice through a microphone; and
  determining, by the mobile terminal in accordance with a determination that to-be-detected voice successfully matches second preset voice, to trigger a switch-back mode.

In this embodiment, a method for determining, based on voice, to trigger a switch-back mode is described. After displaying the first game interface in a first sub-interface after the first game interface is zoomed out, and displaying the first virtual key in a first touch interface, the mobile terminal may further obtain to-be-detected voice through a microphone in real time, and determines, when the to-be-detected voice successfully matches second preset voice, to trigger a switch-back mode. For example, assuming that the second preset voice is "Switch back the interface", when the user says "Switch back the interface" (that is, "Switch back the interface" is to-be-detected voice) to the microphone, the mobile terminal matches the to-be-detected voice with the second preset voice, and in accordance with a determination that the matching succeeds, trigger the switch-back mode. It is to be understood that, the foregoing example is merely for understanding of this solution. The second preset voice may also be set according to an actual selection situation.

In this embodiment of this application, a method for determining, based on voice, to trigger a switch-back mode is provided. In the foregoing manner, the user may switch back the interface through voice, thereby simplifying the user operation and increasing the application flexibility of the solution.

Based on the embodiments corresponding to FIG. 3 and FIG. 7, in another embodiment provided in the embodiments of this application, the first sub-interface and the first touch interface are both embedded interfaces.

After the mobile terminal displays the first game interface in a first sub-interface after the first game interface is zoomed out, and displays the first virtual key in a first touch interface, the following steps may be included:
  creating, by the mobile terminal, the first sub-interface in a first preset region of the main user interface, the first preset region being a fixed region in the main user interface;
  creating, by the mobile terminal, the first touch interface in a second preset region of the main user interface, the second preset region being another fixed region in the main user interface; and
  displaying, by the mobile terminal after the first game interface is zoomed out, the first game interface in the first sub-interface in picture-in-picture mode, and displaying the first virtual key in the first touch interface in picture-in-picture mode.

In this embodiment, a method for implementing interface display based on an embedded interface is described. At least one of the first sub-interface or the first touch interface may be an embedded interface. Since the embedded interface is a fixed interface, the mobile terminal may create the first sub-interface in a first preset region of the main user interface, the first preset region being a fixed region in the main user interface. In addition, the mobile terminal may also create the first touch interface in a second preset region of the main user interface, the second preset region being another fixed region in the main user interface. Based on this, the mobile terminal displays, after the first game interface is zoomed out, the first game interface in the first sub-interface in picture-in-picture mode, and displays the first virtual key in the first touch interface in picture-in-picture mode.

Figure 21:
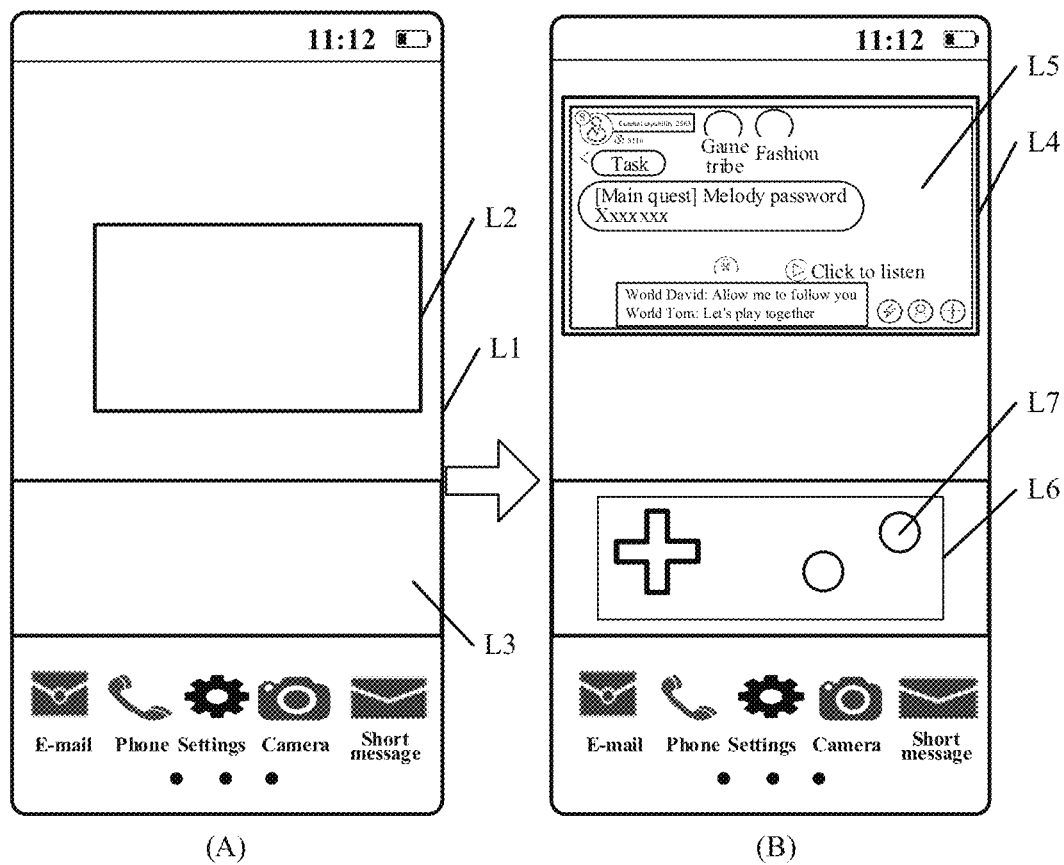
FIG. 21 is a schematic diagram of implementing interface display based on an embedded interface according to an embodiment of this application.

To help understanding, descriptions are provided by using an example in which the mobile terminal is a smartphone. FIG. 21 is a schematic diagram of implementing interface display based on an embedded interface according to an embodiment of this application. As shown in the figure, L1 is used for indicating a main user interface, L2 is used for indicating a first preset region, L3 is used for indicating a second preset region, L4 is used for indicating a first sub-interface, L5 is used for indicating a first game interface that has been zoomed out, L6 is used for indicating a first touch interface, and L7 is used for indicating a first virtual key. The first preset region and the second preset region in FIG. 21(A) are both fixed regions in the main user interface. Therefore, in FIG. 21(B), the first sub-interface is provided in the first preset region, and the first touch interface is provided in the second preset region L3. In a manner similar to that in the foregoing embodiment, the first game interface is zoomed out, then, the first game interface that has been zoomed out is covered on the first sub-interface for presentation, and the first virtual key is displayed in the first touch interface.

In this embodiment of this application, a method for implementing interface display based on an embedded interface is provided. In the foregoing manner, a sub-interface configured to display a game interface and a touch interface configured to control a game are provided in fixed preset regions in a main user interface, to implement an operation of a user on another service on a mobile terminal while continuing a game progress without requiring the user to switch the interface frequently, thereby simplifying the user operation.

Based on the embodiments corresponding to FIG. 3 and FIG. 7, in another embodiment provided in the embodiments of this application, the first sub-interface and the first touch interface are both floating window interfaces.

After the mobile terminal displays the first game interface in a first sub-interface after the first game interface is zoomed out, and displays the first virtual key in a first touch interface, the following steps may be included:

creating, by the mobile terminal, the first sub-interface at an upper layer of the main user interface;
creating, by the mobile terminal, the first touch interface at the upper layer of the main user interface; and
displaying, by the mobile terminal after the first game interface is zoomed out, the first game interface in the first sub-interface in floating window mode, and displaying the first virtual key in the first touch interface in floating window mode.

In this embodiment, a method for controlling interface display based on a floating window interface is described. At least one of the first sub-interface or the first touch interface may be a floating window interface. Since the floating window interface is not a fixed interface, the mobile terminal may create the first sub-interface at an upper layer of the main user interface, and create the first touch interface at the upper layer of the main user interface. The mobile terminal then displays, after the first game interface is zoomed out, the first game interface in the first sub-interface in floating window mode, and may also display the first virtual key in the first touch interface in floating window mode. The floating window interface nay be a non-transparent interface or a translucent interface, which is not limited herein.

Figure 22:
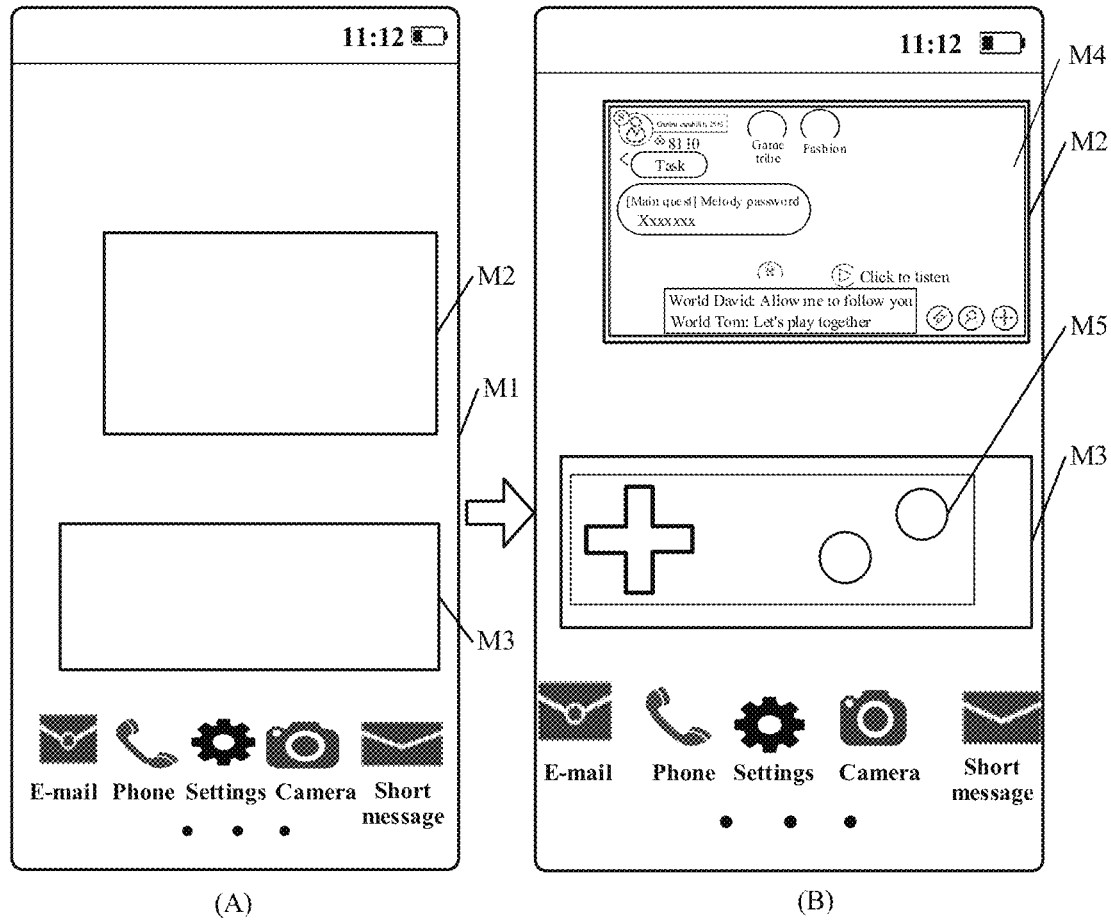
FIG. 22 is a schematic diagram of implementing interface display based on a floating interface according to an embodiment of this application.

To help understanding, descriptions are provided by using an example in which the mobile terminal is a smartphone. FIG. 22 is a schematic diagram of implementing interface display based on a floating interface according to an embodiment of this application. As shown in the figure, M1 is used for indicating a main user interface, M2 is used for indicating a first sub-interface, M3 is used for indicating a first touch interface, M4 is used for indicating a first game interface that has been zoomed out, and M5 is used for indicating a first virtual key. Both the first sub-interface and the first touch interface are located at the upper layer of the main user interface. After being the zoomed out, the first game interface is displayed in the first sub-interface, and the first virtual key is displayed in the first touch interface. Based on this, the interface shown in FIG. 22(B) is obtained.

In this embodiment of this application, a method for controlling interface display based on a floating window interface is provided. In the foregoing manner, a sub-interface configured to display a game interface and a touch interface configured to control a game are provided at an upper layer of a main user interface, to implement an operation of a user on another service on a mobile terminal while continuing a game progress without requiring the user to switch the interface frequently, thereby further simplifying the user operation.

Based on the embodiments corresponding to FIG. 3 and FIG. 7, in another embodiment provided in the embodiments of this application, the following steps are further included:

in response to detecting a drag operation for the first sub-interface, controlling, by the mobile terminal, the first sub-interface to move along a dragging trajectory corresponding to the drag operation;
in response to detecting a drag operation for the first touch interface, controlling, by the mobile terminal, the first touch interface to move along a dragging trajectory corresponding to the drag operation;
in response to detecting a zoom operation for the first sub-interface, controlling, by the mobile terminal, the first sub-interface to be zoomed in or zoomed out according to the zoom operation; and
in response to detecting a zoom operation is triggered for the first touch interface, controlling, by the mobile terminal, the first touch interface to be zoomed in or zoomed out according to the zoom operation.

Figure 23:
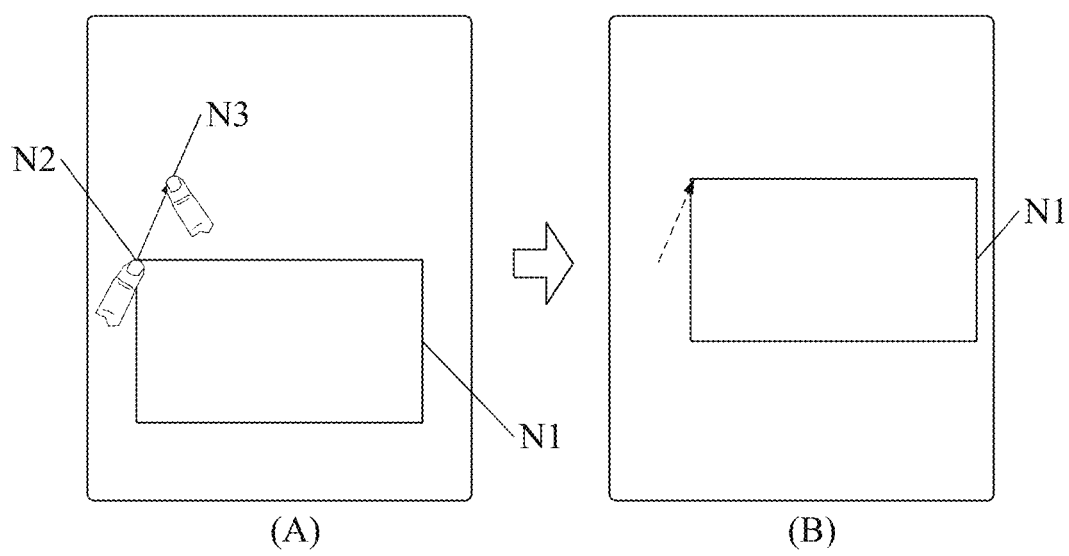
FIG. 23 is a schematic diagram of performing a drag operation for a first sub-interface according to an embodiment of this application.

In this embodiment, a method for adjusting a position and a size of a floating window is described. For a floating window interface, the user may also perform a drag operation and a zoom operation. FIG. 23 is a schematic diagram of performing a drag operation for a first sub-interface according to an embodiment of this application. As shown in the figure, N1 is used for indicating a first sub-interface, N2 is used for indicating a start position, and N3 is used for indicating an end position. FIG. 23(A) shows that the user performs a drag operation from the start position to the end position, a dragging trajectory being from the start position to the end position. Therefore, the mobile terminal can control the first sub-interface to move from the start position to the end position, that is, FIG. 23(B) is obtained. It may be understood that, details of performing a drag operation for the first touch interface are not described again.

Figure 24:
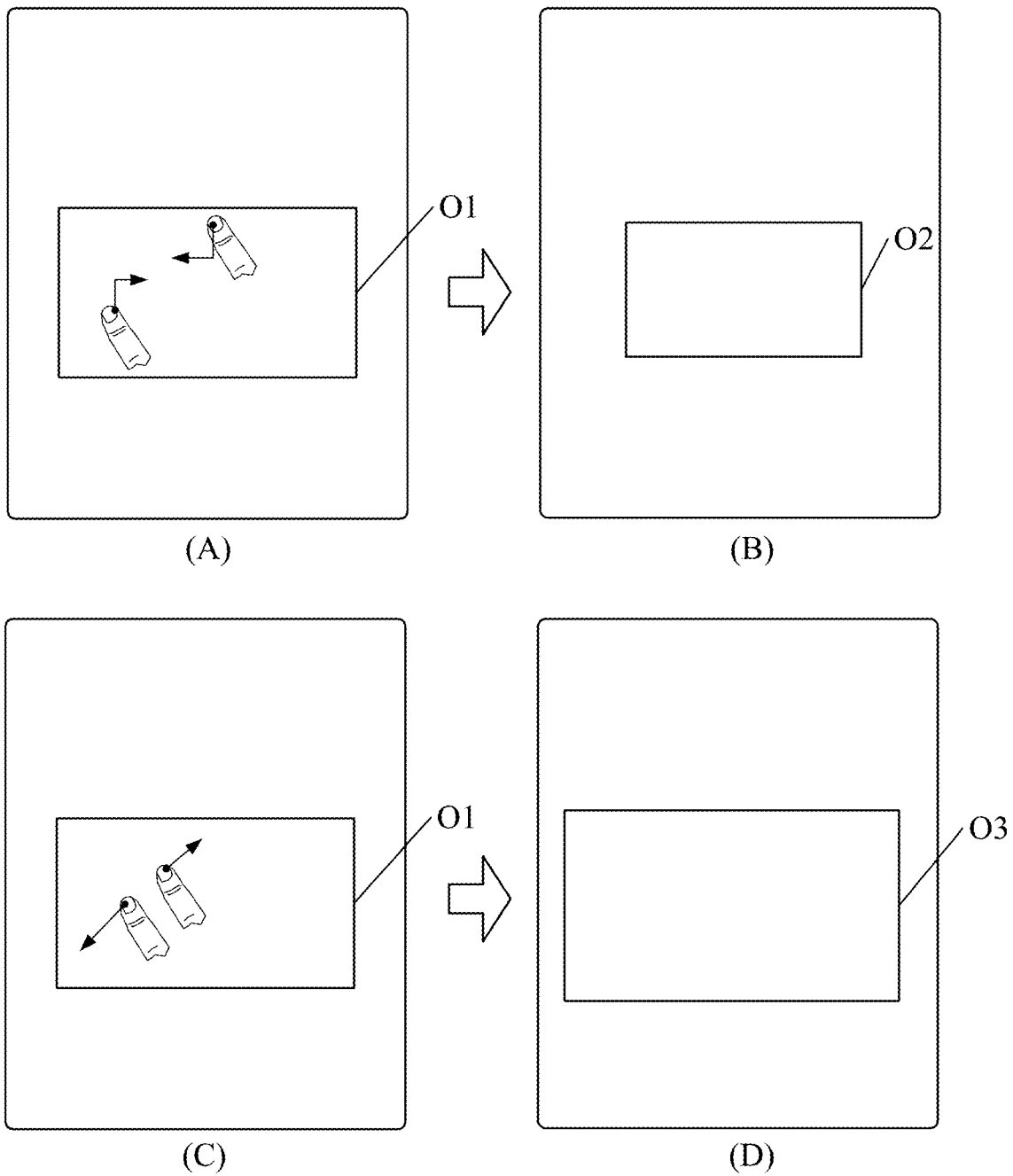
FIG. 24 is a schematic diagram of performing a zoom operation for a first sub-interface according to an embodiment of this application.

The user may also perform a zoom operation for the first sub-interface, for example, zoom in or out the first sub-interface. The zoom operation includes a zoom-out operation and a zoom-in operation. The zoom-out operation is pinching at least two touch points inward, and the zoom-in operation is stretching at least two touch points outward. FIG. 24 is a schematic diagram of performing a zoom operation for a first sub-interface according to an embodiment of this application. As shown in the figure, O1 is used for indicating a first sub-interface, O2 is used for indicating a first sub-interface that has been zoomed out, and O3 is used for indicating a first sub-interface that has been zoomed in. FIG. 24(A) shows pinching the fingers inward on the touch-screen of the mobile terminal, that is, a zoom-out operation for the first sub-interface is triggered. Therefore, FIG. 24(B) is obtained, and the first sub-interface has been zoomed out. FIG. 24(C) shows stretching the fingers outward on the touchscreen of the mobile terminal, that is, a zoom-in operation for the first sub-interface is triggered. Therefore, FIG. 24(D) is obtained, and the first sub-interface has been zoomed in. It may be understood that, details of performing a zoom operation for the first touch interface are not described again.

In the embodiments of this application, a method for adjusting a position and a size of a floating window is provided. In the foregoing manner, for the floating window interface, positions and sizes of the first sub-interface and the first touch interface may also be adjusted according to user requirements, thereby improving the flexibility of this solution.

Based on the embodiments corresponding to FIG. 3 and FIG. 7, in another embodiment provided in the embodiments of this application, before the mobile terminal provides a first sub-interface and a first touch interface in the main user interface, the following steps are further included:

obtaining, by the mobile terminal, a game type of the first game application;

determining, by the mobile terminal, a first touch interface from at least one creatable touch interface according to the game type of the first game application, each creatable touch interface displaying a corresponding virtual key.

In this embodiment, a method for adjusting a touch interface based on a game type is described. Because different game types correspond to different creatable touch interfaces, before displaying the first game interface in a first sub-interface after the first game interface is zoomed out, and displaying the first virtual key in a first touch interface, the mobile terminal may obtain a game type of the first game application, and then determine a first touch interface from at least one creatable touch interface according to the game type of the first game application, so as to display a virtual key corresponding to the game type.

The game type may be a sports game, a leisure game, a role-playing games (RPG), and the like. For example, a touch interface corresponding to a sports game may include virtual keys such as "Jump" and "Squat". For example, a touch interface corresponding to a leisure game may include virtual keys such as "Left", "Right", and "Shoot". In another example, a touch interface corresponding to an RPG may include directional virtual keys and the like. In an actual application, the user may also customize a parameter of the first touch interface. The parameter includes, but is not limited to, interface transparency, an interface background color, an interface pattern, an interface text, shapes and sizes of virtual keys, and the like, which are not limited herein.

Figure 25:
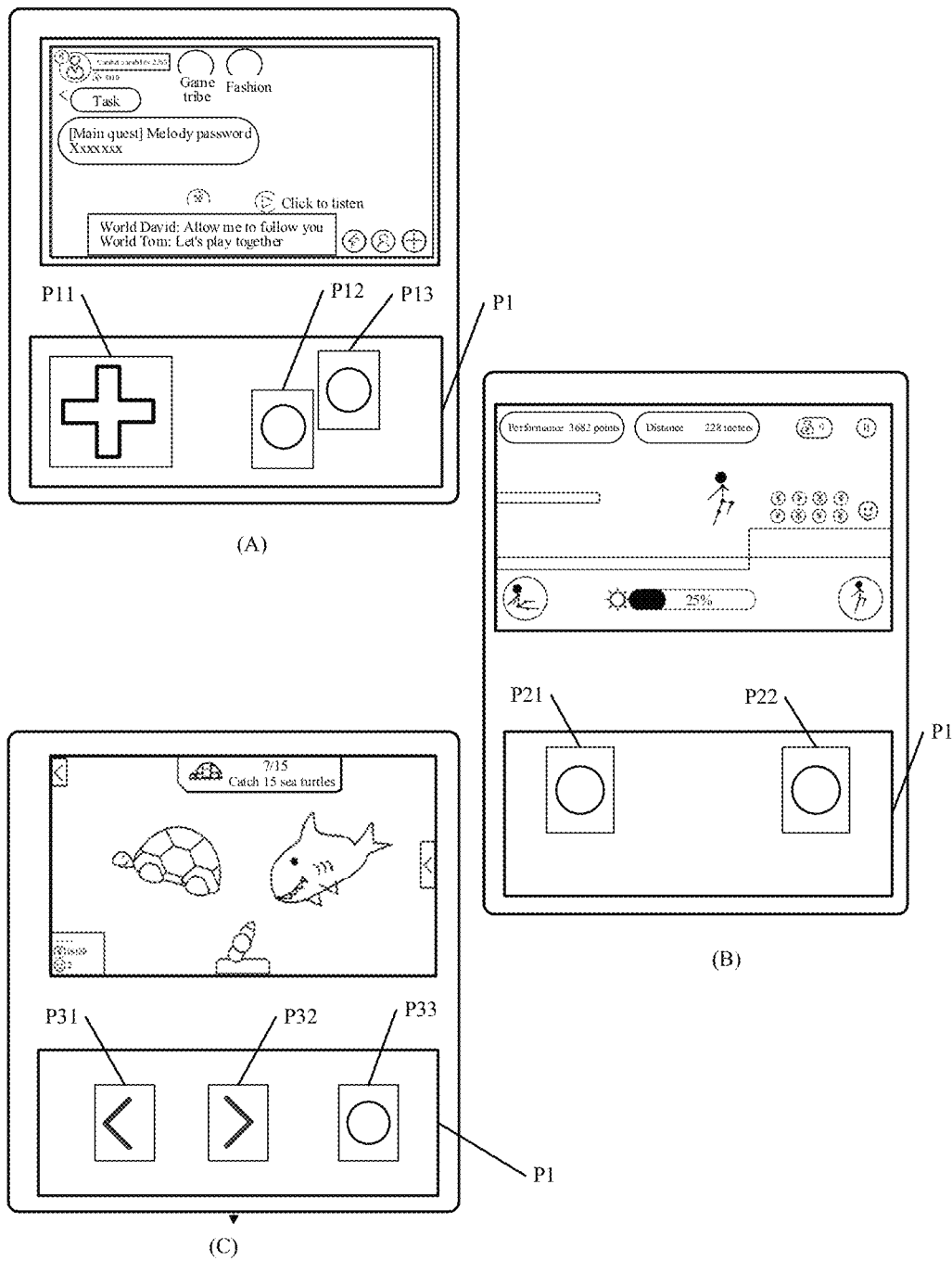
FIG. 25 is a schematic diagram of an embodiment of a first touch interface according to an embodiment of this application.

To help understanding, reference may be made to FIG. 25. FIG. 25 is a schematic diagram of an embodiment of a first touch interface according to an embodiment of this application. FIG. 25(A) shows a main user interface corresponding to an RPG. FIG. 25(B) shows a main user interface corresponding to a sports game. FIG. 25(C) shows a main user interface corresponding to a leisure game. As shown in the figure, P1 is used for indicating a first touch interface. In (A), P11 is used for indicating a directional virtual key, P12 is used for indicating a virtual key of a "Confirm" function, and P13 is used for indicating a virtual key of a "Cancel" function. In (B), P21 is used for indicating a virtual key of a "Jump" function, and P22 is used for indicating a virtual key of a "Squat" function. In (C), P31 is used for indicating a "Move leftward" virtual key, P32 is used for indicating a "Move rightward" virtual key, and P33 is used for indicating a virtual key of a "Shoot" function.

Figure 26:
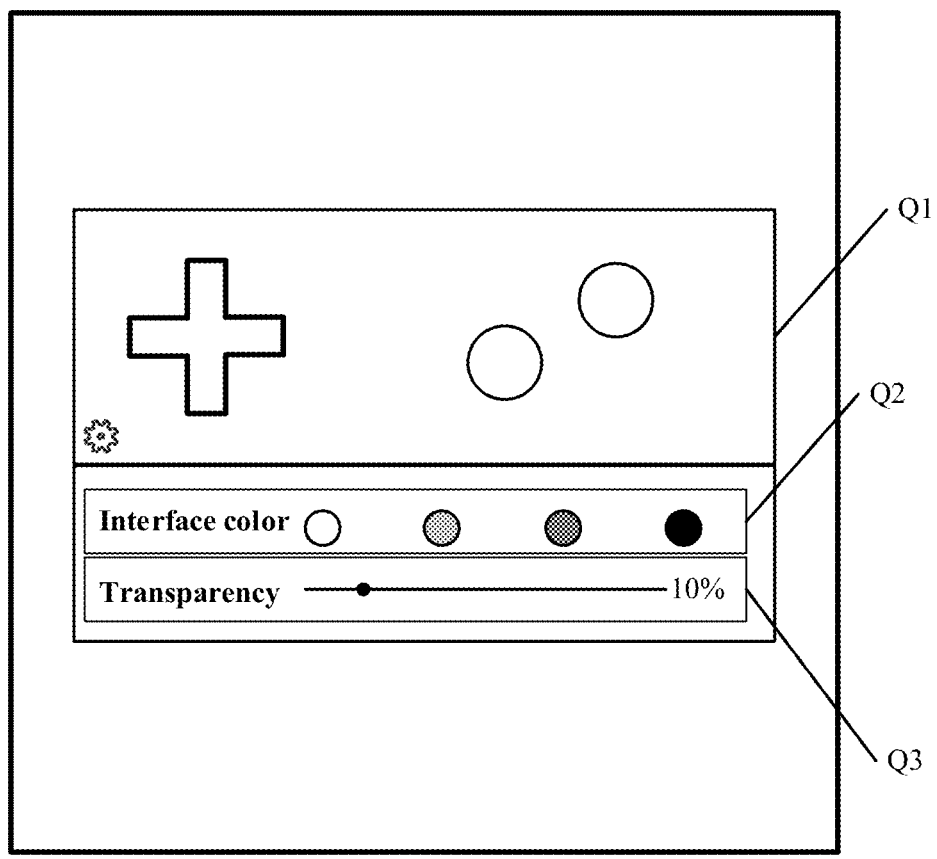
FIG. 26 is a schematic diagram of an embodiment of selecting a parameter of a first touch interface according to an embodiment of this application.

Descriptions are provided by using an example in which a parameter of the first touch interface includes interface transparency and an interface color. FIG. 26 is a schematic diagram of an embodiment of selecting a parameter of a first touch interface according to an embodiment of this application. As shown in the figure, Q1 is used for indicating a first touch interface, Q2 is used for indicating an interface color selection region, and Q3 is used for indicating a transparency selection region. The user may adjust the interface color and the transparency according to requirements.

In this embodiments of this application, a method for adjusting a touch interface based on a game type is provided. In the foregoing manner, different touch interfaces may be set for different game types, which helps to control different types of games. In addition, the parameter of the first touch interface may also be adjusted according to user requirements, thereby increasing the flexibility of this solution.

Based on the embodiments corresponding to FIG. 3 and FIG. 7, in another embodiment provided in the embodiments of this application, the following steps are further included:

in response to detecting that a second game application is running, displaying, by the mobile terminal, a second game interface corresponding to the second game application in full-screen mode; and in response to detecting that a switch mode is triggered, displaying, by the mobile terminal, the second game interface in a second sub-interface after zooming out the second game interface, and displaying a second virtual key in a second touch interface, the second virtual key being configured to control the second game application, and the second sub-interface and the second touch interface both being displayed in the main user interface.

In this embodiment, a method for displaying a plurality of game interfaces simultaneously is described. The mobile terminal may also run a second game application, and display a second game interface corresponding to the second game application in full-screen mode. When a switch mode is satisfied, a second sub-interface and a second touch interface can be provided in the main user interface. In addition, the second game interface is displayed in the second sub-interface after being zoomed out, and a second virtual key is displayed on the second touch interface. The second virtual key is configured to control the second game application. A manner of triggering a switch mode is similar to that in the foregoing embodiment, and details are not described herein again.

Figure 27:
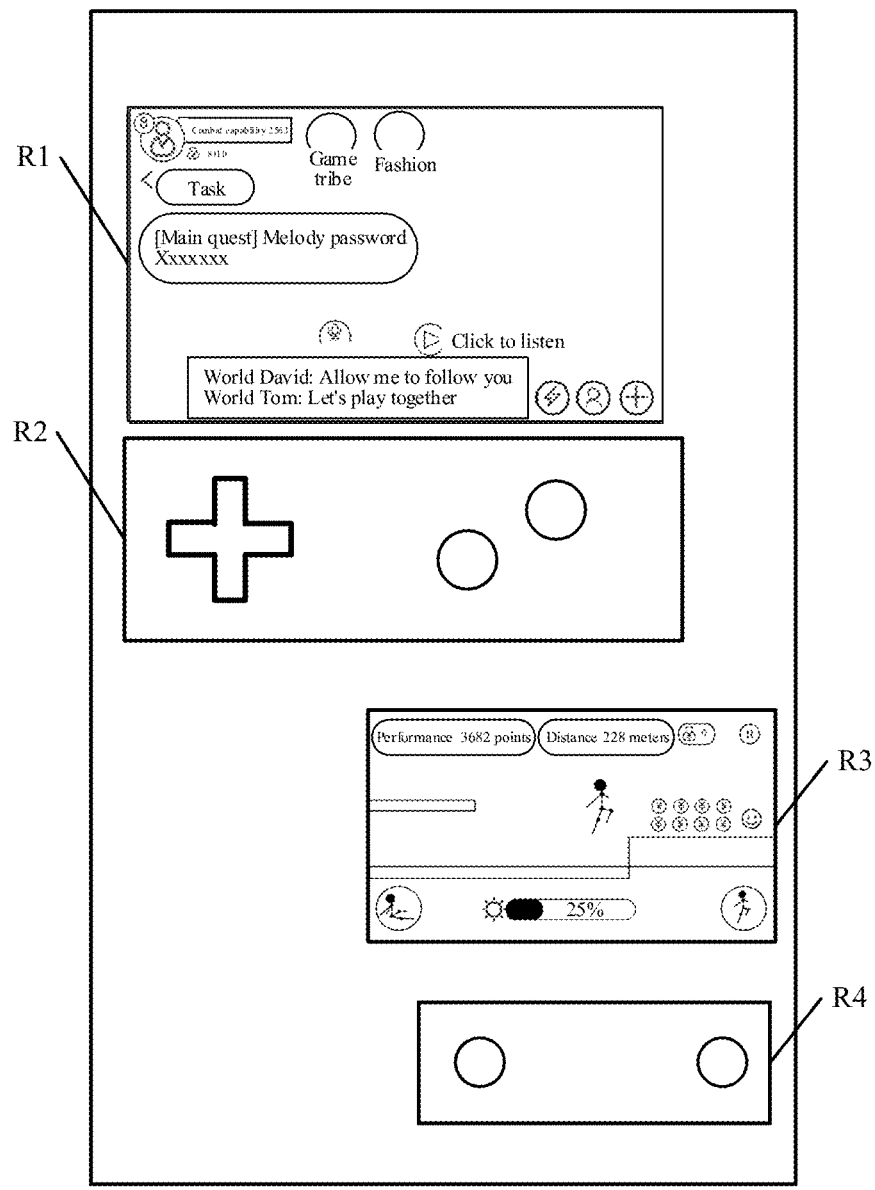
FIG. 27 is a schematic diagram of another embodiment of a method for controlling interface display according to an embodiment of this application.

To help understanding, reference may be made to FIG. 27. FIG. 27 is a schematic diagram of another embodiment of a method for controlling interface display according to an embodiment of this application. As shown in the figure, R1 is used for indicating a first sub-interface, R2 is used for indicating a first touch interface, R3 is used for indicating a second sub-interface, and R4 is used for indicating a second touch interface. In the main user interface, a first game interface that has been zoomed out is displayed in the first sub-interface, a second game interface that has been zoomed out is displayed in the second sub-interface, a first virtual key corresponding to the first game application is displayed in the first touch interface, and a second virtual key corresponding to the second game application is displayed in the second touch interface. It is to be understood that, the example of FIG. 27 is merely used for understanding this solution. Display positions and sizes of the second sub-interface and the second touch interface can be flexibly set according to user requirements.

In this embodiment of this application, a method for displaying a plurality of game interfaces simultaneously is provided. In the foregoing manner, the mobile terminal can display a plurality of game applications in the main user interface, to implement an operation on another service on the mobile terminal while continuing two game progresses, thereby increasing the convenience of the operation.

Based on the embodiments corresponding to FIG. 3 and FIG. 7, in another embodiment provided in the embodiments of this application, the following steps are further included:

in response to determining that a video application is running, displaying, by the mobile terminal, a video application interface corresponding to the video application in main user interface; and in accordance with determining that a switch mode is triggered, displaying, by the mobile terminal, the video application interface in a third sub-interface after the video application interface is zoomed out, the third sub-interface being displayed in the main user interface.

In this embodiment, a method for displaying a game interface and a video interface simultaneously is described. The mobile terminal may also run a video application, and therefore, display a video application interface corresponding to the video application in main user interface. When a switch mode is triggered, a third sub-interface is provided in the main user interface. Therefore, the video application interface is zoomed out and displayed in the third sub-interface. A manner of triggering a switch mode and a manner of creating a third sub-interface are similar to those in the foregoing embodiment, and details are not described herein again.

Figure 28:
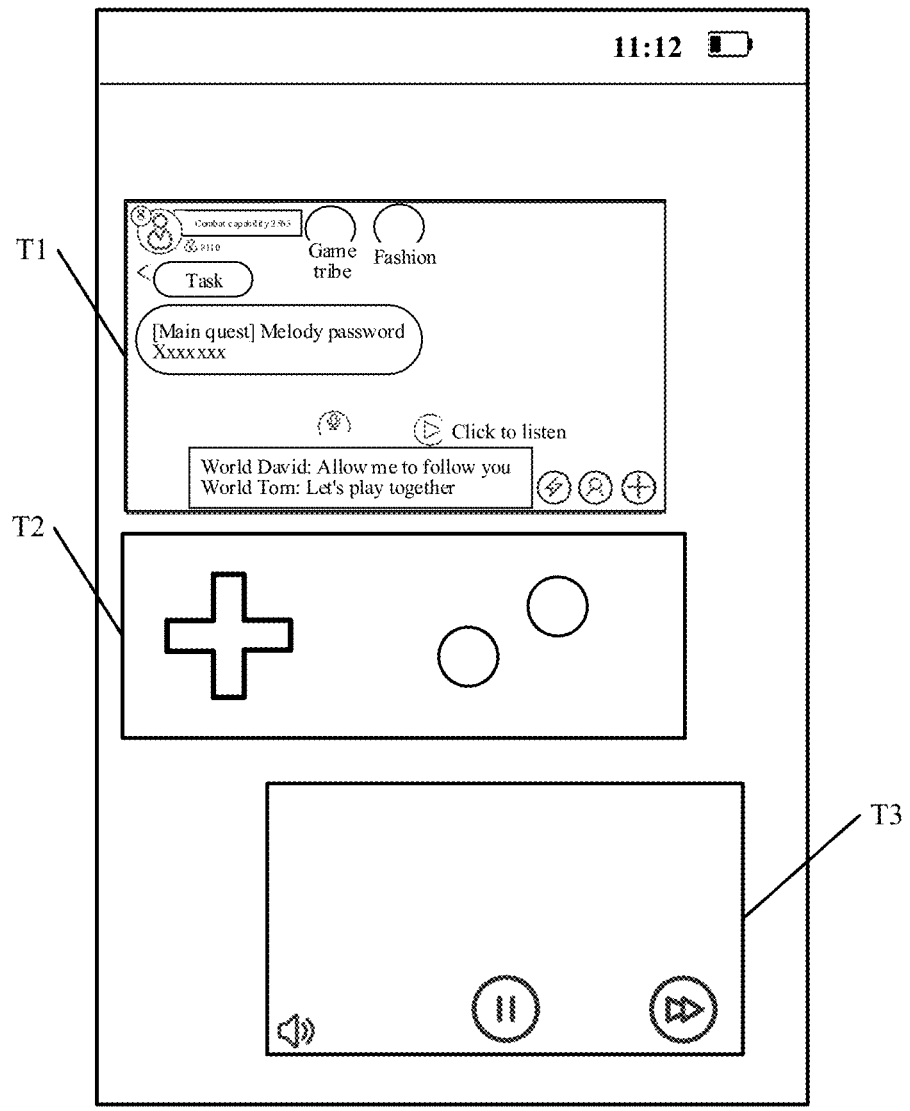
FIG. 28 is a schematic diagram of another embodiment of a method for controlling interface display according to an embodiment of this application.

To help understanding, reference may be made to FIG. 28. FIG. 28 is a schematic diagram of another embodiment of a method for controlling interface display according to an embodiment of this application. As shown in the figure, T1 is used for indicating a first sub-interface, T2 is used for indicating a first touch interface, and T3 is used for indicating a third sub-interface. In the main user interface, a first game interface that has been zoomed out is displayed in the first sub-interface, a first virtual key is displayed in the first touch interface, and a video application interface that has been zoomed out is displayed in the third sub-interface. It is to be understood that, the example of FIG. 28 is merely used for understanding this solution. A position and a size of the third sub-interface can be flexibly set according to user requirements.

In this embodiment of this application, a method for displaying a game interface and a video interface simultaneously is provided. In the foregoing manner, the mobile terminal not only can display a game application in the main user interface, but also can display a video application in the main user interface simultaneously, and in addition, implements an operation of the user on another service on the mobile terminal, thereby satisfying diverse requirements of the user and further simplifying the user operation.

Based on the embodiments corresponding to FIG. 3 and FIG. 7, in another embodiment provided in the embodiments of this application, after the mobile terminal displays the first game interface in a first sub-interface after scaling down the first game interface, and displays the first virtual key in a first touch interface, the following step is further included:

in accordance with a determination that a target application is running, displaying, by the mobile terminal, an application interface corresponding to the target application in full-screen mode in the main user interface, and displaying a first sub-interface and a first touch interface in the main user interface, the target application including at least one of a messaging application, an entertainment application, or a tool application.

In this embodiment, a method for displaying a game interface and an information interface simultaneously is described. After displaying the first game interface in a first sub-interface after the first game interface is zoomed out, and displaying the first virtual key in a first touch interface, the mobile terminal may also display, if running a target application, an application interface of the target application in full-screen mode in the main user interface, and at the same time, continuously display the first sub-interface and the first touch interface in the main user interface. The target application includes, but is not limited to, a messaging application, an entertainment application, and a tool application.

The messaging application includes, but is not limited to, a media instant messaging application of such as Chat, Social, Email, and Community. The entertainment application includes, but is not limited to, applications such as Music, Ringtone, Player, Live streaming, Entertainment, and Horoscope. The tool application includes, but is not limited to, applications such as Life services, Food, Weather, Calendar, Utilities, Flashlight, Note, Office tools, Network disk storage, and Office software. The application interface can be displayed in full-screen mode when the user performs an operation on the target application in the main user interface. For example, operations such as replying to a message, checking an email, ordering a takeaway, listening to a song, browsing the microblog, surfing on the Internet, taking a picture, and setting the system may all be displayed in full-screen mode, and the user may also perform the operations while continuing the game progress.

Figure 29:
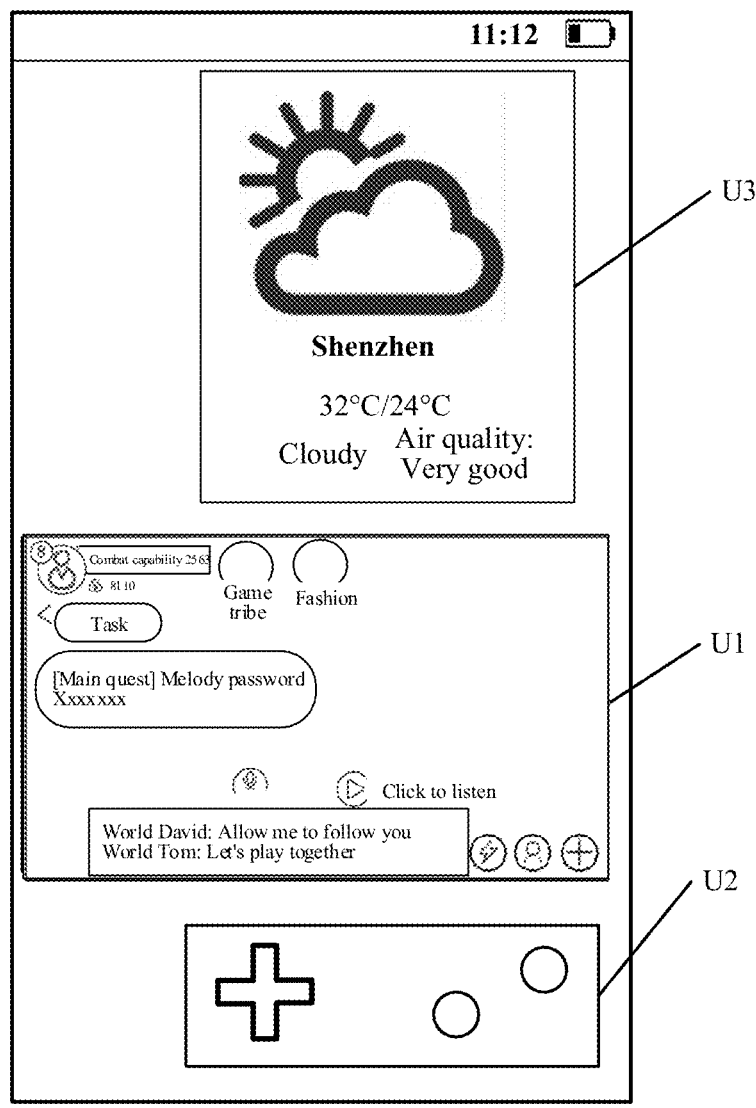
FIG. 29 is a schematic diagram of another embodiment of a method for controlling interface display according to an embodiment of this application.

To help understanding, descriptions are provided by using an example in which the target application is a tool application. FIG. 29 is a schematic diagram of another embodiment of a method for controlling interface display according to an embodiment of this application. As shown in the figure, U1 is used for indicating a first sub-interface, U2 is used for indicating a first touch interface, and U3 is used for indicating a tool application interface. In the main user interface, a first game interface that has been zoomed out is displayed in the first sub-interface, a first virtual key is displayed in the first touch interface, and a tool application interface corresponding to the tool application is displayed in full-screen mode.

In this embodiment of this application, a method for displaying a game interface and an information interface simultaneously is provided. In the foregoing manner, the mobile terminal displays a plurality of types of applications in the main user interface, and not only can continue the game progress, but also can perform an operation on another application, to implement operations of the user on a plurality of types of application services on the mobile terminal, thereby satisfying the diverse requirements of the user.

Figure 30:
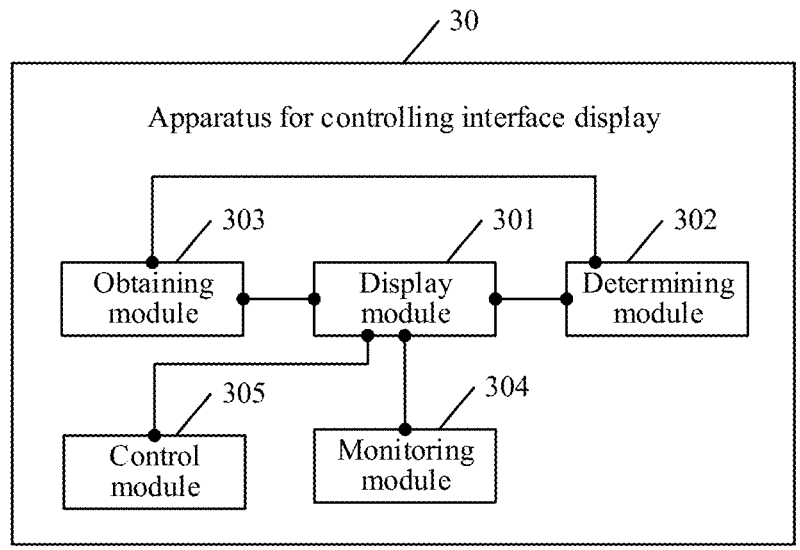
FIG. 30 is a schematic diagram of an apparatus for controlling interface display according to an embodiment of this application.

An apparatus for controlling interface display in this application is described below in detail. FIG. 30 is a schematic diagram of an apparatus for controlling interface display according to an embodiment of this application. An apparatus 30 for controlling interface display includes:

a display module 301, configured to display a first game interface and a first virtual key in a main user interface in full-screen mode in accordance with a determination that a first game application is running, the first virtual key being configured to control the first game application, the display module 301 being further configured to display, in accordance with a determination that a switch mode is triggered, the first game interface in a first sub-interface after the first game interface is zoomed out, and display the first virtual key in a first touch interface, the first sub-interface and the first touch interface being provided in the main user interface in accordance with a determination that the switch mode is triggered, the first touch interface being configured to display a virtual key for controlling the first game application.

In a possible implementation, based on the embodiment corresponding to FIG. 30, in another embodiment of the apparatus 30 for controlling interface display provided in this embodiment of this application, the display module 301 is further configured to display the first game interface in a first sub-interface after the first game interface is zoomed out, and display the first virtual key in a first touch interface; and display the first game interface and the first virtual key in the main user interface in full-screen mode in accordance with a determination that a switch-back mode is triggered.

In a possible implementation, based on the embodiment corresponding to FIG. 30, in another embodiment of the apparatus 30 for controlling interface display provided in this embodiment of this application, the apparatus 30 for controlling interface display further includes a determining module 302.

The determining module 302 is configured to trigger the switch mode in accordance with a determination that a preset switch operation is triggered, the preset switch operation including at least one of a click operation, a press operation, a slide operation, a double-click operation, or a multi-touch operation.

In a possible implementation, based on the embodiment corresponding to FIG. 30, in another embodiment of the apparatus 30 for controlling interface display provided in this embodiment of this application, the determining module 302 is further configured to trigger the switch mode in accordance with a determination that a click operation is triggered for a first virtual button in the first game interface;

or determine to trigger the switch mode in accordance with a determination that a press operation is triggered for the first game interface, a press time of the press operation being greater than or equal to a first time threshold;

or determine to trigger the switch mode in accordance with a determination that a slide operation is triggered for the first game interface, a sliding trajectory of the slide operation being generated based on a start position of a touch object and an end position of the touch object;

or determine to trigger the switch mode in accordance with a determination that a double-click operation is triggered for the first game interface, a double-click time interval of the double-click operation is less than or equal to a second time threshold;

or determine to trigger the switch mode in accordance with a determination that a multi-touch operation is triggered for the first game interface, the multi-touch operation being generated based on at least two touch points after the at least two touch points are pinched inward.

In a possible implementation, based on the embodiment corresponding to FIG. 30, in another embodiment of the apparatus 30 for controlling interface display provided in this embodiment of this application, the determining module 302 is further configured to trigger the switch-back mode in accordance with a determination that a preset switch-back operation is triggered for the first sub-interface, the preset switch-back operation including at least one of a click operation, a press operation, a slide operation, a double-click operation, or a multi-touch operation.

In a possible implementation, based on the embodiment corresponding to FIG. 30, in another embodiment of the apparatus 30 for controlling interface display provided in this embodiment of this application, the determining module 302 is further configured to trigger the switch-back mode in accordance with a determination that a click operation is triggered for a second virtual button in the first sub-interface;

or determine to trigger the switch-back mode in accordance with a determination that a press operation is triggered for the first sub-interface, a press time of the press operation being greater than or equal to a first time threshold;

or determine to trigger the switch-back mode in accordance with a determination that a slide operation is triggered for the first sub-interface, a sliding trajectory of the slide operation being generated based on a start position of a touch object and an end position of the touch object;

or determine to trigger the switch-back mode in accordance with a determination that a double-click operation is triggered for the first sub-interface, a double-click time interval of the double-click operation is less than or equal to a second time threshold;

or determine to trigger the switch-back mode in accordance with a determination that a multi-touch operation is triggered for the first sub-interface, the multi-touch operation being generated based on at least two touch points after the at least two touch points are stretched outward.

In a possible implementation, based on the embodiment corresponding to FIG. 30, in another embodiment of the apparatus 30 for controlling interface display provided in this embodiment of this application, the apparatus 30 for controlling interface display further includes an obtaining module 303.

The obtaining module 303 is configured to obtain, after the display module 301 displays a first game interface and a first virtual key in a main user interface in full-screen mode, a device usage state through a gravity sensor, the device usage state being used for describing an attitude of the mobile terminal being held.

The determining module 302, is further configured to trigger the switch mode in accordance with a determination that the device usage state indicates that the mobile terminal is in a portrait-screen usage state.

In a possible implementation, based on the embodiment corresponding to FIG. 30, in another embodiment of the apparatus 30 for controlling interface display provided in this embodiment of this application, the obtaining module 303 is further configured to obtain, after the display module 301 displays the first game interface in a first sub-interface after the first game interface is zoomed out, and displays the first virtual key in a first touch interface, a device usage state may be obtained through a gravity sensor, the device usage state being used for describing an attitude of the mobile terminal being held.

The determining module 302 is further configured to trigger the switch-back mode when the device usage state indicates that the mobile terminal is in a landscape-screen usage state.

In a possible implementation, based on the embodiment corresponding to FIG. 30, in another embodiment of the apparatus 30 for controlling interface display provided in this embodiment of this application, the obtaining module 303 is further configured to obtain a face image through a front-facing camera after the display module 301 displays a first game interface and a first virtual key in a main user interface in full-screen mode.

The determining module 302 is further configured to determine, according to the face image, left eye coordinates corresponding to the left eye and right eye coordinates corresponding to the right eye.

The determining module 302 is further configured to determine a two-eye coordinate connecting line according to the left eye coordinates and the right eye coordinates.

The determining module 302 is further configured to trigger the switch mode when an angle between the two-eye coordinate connecting line and a horizontal direction of the mobile terminal is less than or equal to an angle threshold, the horizontal direction of the mobile terminal representing a horizontal direction of the mobile terminal in a portrait-screen usage state.

In a possible implementation, based on the embodiment corresponding to FIG. 30, in another embodiment of the apparatus 30 for controlling interface display provided in this embodiment of this application, the obtaining module 303 is further configured to obtain a face image through a front-facing camera after the display module displays the first game interface in a first sub-interface after the first game interface is zoomed out, and displays the first virtual key in a first touch interface.

The determining module 302 is further configured to determine, according to the face image, left eye coordinates corresponding to the left eye and right eye coordinates corresponding to the right eye.

The determining module 302 is further configured to determine a two-eye coordinate connecting line according to the left eye coordinates and the right eye coordinates.

The determining module 302 is further configured to trigger the switch-back mode when an angle between the two-eye coordinate connecting line and a horizontal direction of the mobile terminal is greater than an angle threshold, the horizontal direction of the mobile terminal representing a horizontal direction of the mobile terminal in a portrait-screen usage state.

In a possible implementation, based on the embodiment corresponding to FIG. 30, in another embodiment of the apparatus 30 for controlling interface display provided in this embodiment of this application, the apparatus 30 for controlling interface display further includes a monitoring module 304.

The monitoring module 304 is configured to monitor an incoming call reminder after the display module 301 displays a first game interface and a first virtual key in a main user interface in full-screen mode.

The determining module 302 is further configured to trigger the switch mode when an answering instruction for the incoming call reminder is triggered.

In a possible implementation, based on the embodiment corresponding to FIG. 30, in another embodiment of the apparatus 30 for controlling interface display provided in this embodiment of this application, the obtaining module 303 is further configured to obtain to-be-detected voice through a microphone after the display module displays a first game interface and a first virtual key in a main user interface in full-screen mode, a face image through a front-facing camera.

The determining module 302 is further configured to, in accordance with a determination that to-be-detected voice successfully matches first preset voice, trigger a switch mode.

In a possible implementation, based on the embodiment corresponding to FIG. 30, in another embodiment of the apparatus 30 for controlling interface display provided in this embodiment of this application, the obtaining module 303 is further configured to obtain to-be-detected voice through a microphone after the display module displays the first game interface in a first sub-interface after the first game interface is zoomed out, and displays the first virtual key in a first touch interface.

The determining module 302 is further configured to, in accordance with a determination that to-be-detected voice successfully matches second preset voice, trigger a switch-back mode.

In a possible implementation, based on the embodiment corresponding to FIG. 30, in another embodiment of the apparatus 30 for controlling interface display provided in this embodiment of this application, the first sub-interface and the first touch interface are both embedded interfaces.

The display module 301 is further configured to create the first sub-interface in a first preset region of the main user interface, the first preset region being a fixed region in the main user interface;

create the first touch interface in a second preset region of the main user interface, the second preset region being another fixed region in the main user interface; and display, after the first game interface is zoomed out, the first game interface in the first sub-interface in picture-in-picture mode, and display the first virtual key in the first touch interface in picture-in-picture mode.

In a possible implementation, based on the embodiment corresponding to FIG. 30, in another embodiment of the apparatus 30 for controlling interface display provided in this embodiment of this application, the first sub-interface and the first touch interface are both floating window interfaces.

The display module 301 is further configured to create the first sub-interface at an upper layer of the main user interface;
  create the first touch interface at the upper layer of the main user interface; and
  display, after the first game interface is zoomed out, the first game interface in the first sub-interface in floating window mode, and display the first virtual key in the first touch interface in floating window mode.

In a possible implementation, based on the embodiment corresponding to FIG. 30, in another embodiment of the apparatus 30 for controlling interface display provided in this embodiment of this application, the apparatus 30 for controlling interface display further includes a control module 305.

The control module 305 is configured to control, in accordance with a determination that a drag operation is triggered for the first sub-interface, the first sub-interface to move along a dragging trajectory corresponding to the drag operation.

The control module 305 is further configured to control, in accordance with a determination that a drag operation is triggered for the first touch interface, the first touch interface to move along a dragging trajectory corresponding to the drag operation.

The control module 305 is further configured to control, in accordance with a determination that a zoom operation is triggered for the first sub-interface, the first sub-interface to be zoomed in or zoomed out according to the zoom operation.

The control module 305 is further configured to control, in accordance with a determination that a zoom operation is triggered for the first touch interface, the first touch interface to be zoomed in or zoomed out according to the zoom operation.

In a possible implementation, based on the embodiment corresponding to FIG. 30, in another embodiment of the apparatus 30 for controlling interface display provided in this embodiment of this application,
  the obtaining module 303 is further configured to obtain a game type of the first game application before the display module displays the first game interface in a first sub-interface after the first game interface is zoomed out, and displays the first virtual key in a first touch interface.

The determining module 302, is further configured to determine a first touch interface from at least one creatable touch interface according to the game type of the first game application, each creatable touch interface displaying a corresponding virtual key.

In a possible implementation, based on the embodiment corresponding to FIG. 30, in another embodiment of the apparatus 30 for controlling interface display provided in this embodiment of this application,
  the display module 301 is further configured to display, in accordance with a determination that a switch mode is triggered, the second game interface in a second sub-interface after zooming out the second game interface, and display a second virtual key in a second touch interface, the second virtual key being configured to control the second game application, and the second sub-interface and the second touch interface both being displayed in the main user interface.

In a possible implementation, based on the embodiment corresponding to FIG. 30, in another embodiment of the apparatus 30 for controlling interface display provided in this embodiment of this application,
  the display module 301 is further configured to display, in response to determining that a video application is running, a video application interface corresponding to the video application in main user interface.

The display module 301 is further configured to display, in accordance with a determination that a switch mode is triggered, the video application interface in a third sub-interface after the video application interface is zoomed out, the third sub-interface being displayed in the main user interface.

In a possible implementation, based on the embodiment corresponding to FIG. 30, in another embodiment of the apparatus 30 for controlling interface display provided in this embodiment of this application,
  the display module 301 is further configured to: after displaying the first game interface in a first sub-interface after the first game interface is zoomed out, and displaying the first virtual key in a first touch interface, in response to determining that a target application is running, display an application interface corresponding to the target application in full-screen mode in the main user interface, and display a first sub-interface and a first touch interface in the main user interface, the target application including at least one of a messaging application, an entertainment application, or a tool application.

Figure 31:
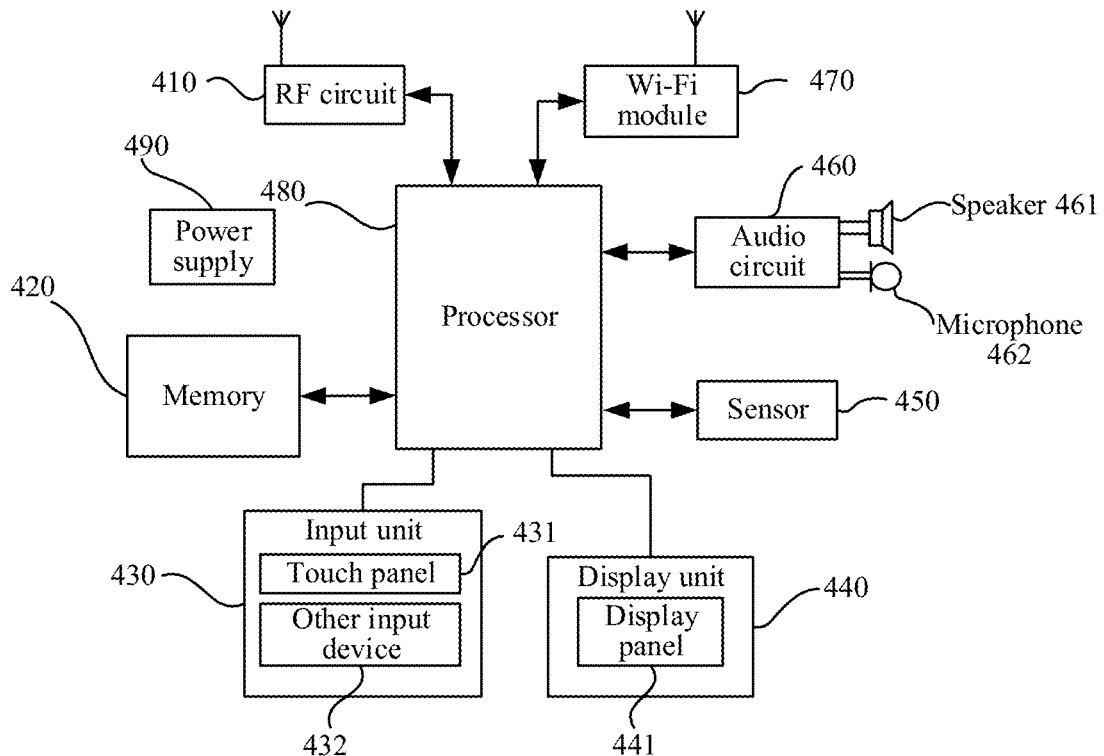
FIG. 31 is a schematic structural diagram of a mobile terminal according to an embodiment of this application.

The embodiments of this application further provide another apparatus for controlling interface display. As shown in FIG. 31, for ease of description, only parts related to this embodiment of this application are shown. For specific undisclosed technical details, reference may be made to the method part in the embodiments of this application. In this embodiment of this application, descriptions are provided by using an example in which the mobile terminal is a smartphone.

FIG. 31 is a block diagram of a structure of a part of a smartphone related to a mobile terminal according to an embodiment of this application. Referring to FIG. 31, the smartphone includes components such as a radio frequency (RF) circuit 410, a memory 420, an input unit 430, a display unit 440, a sensor 450, an audio circuit 460, a wireless fidelity (Wi-Fi) module 470, a processor 480, and a power supply 490. The input unit 430 may include a touch panel 431 and another input device 432. The display unit 440 may include display panel 441. The audio circuit 460 may include a speaker 461 and a microphone 462. A person skilled in the art may understand that the structure of the smartphone shown in FIG. 31 does not constitute a limitation on the smartphone, and the smartphone may comprise more components or fewer components than those shown in the figure, or some components may be combined, or a different component deployment may be used.

The following makes a detailed description of the components of the smartphone with reference to FIG. 31:
  the processor 480 is a control center of the smartphone, and is connected to various parts of the entire smartphone by using various interfaces and lines. By running or executing the software program and/or the module stored in the memory 420, and invoking data stored in the memory 420, the processor executes various functions of the smartphone and performs data processing, thereby monitoring the entire smartphone. In some embodiments, the processor 480 may comprise one or more processing units. Exemplarily, the processor 480 may integrate an application processor and a modem processor. The application processor mainly processes an operating system, a user interface, an application, and the like. The modem processor mainly processes wireless communication. It may be understood that the modulation and demodulation processor may not be integrated into the processor 480.

Although not shown in the figure, the smartphone may further comprise a camera, a Bluetooth module, and the like, and details are not described herein.

In this embodiment of this application, the processor 480 included in the terminal may implement functions in an embodiment corresponding to any one of FIG. 3 to FIG. 29.

The embodiments of this application further provide a computer-readable storage medium is provided, storing a computer program, the computer program, when run on a computer, causing the computer to perform the method described in the foregoing embodiments.

The embodiments of this application further provide a computer program product including instructions, the instructions, when run on a computer, causing the computer to perform the method described in the foregoing embodiments.

A person skilled in the art may clearly understand that, for the purpose of convenient and brief description, for a detailed working process of the system, apparatus, and unit described above, refer to a corresponding process in the method embodiments, and details are not described herein again.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The foregoing embodiments are merely intended for describing the technical solutions of the present disclosure, but not for limiting this application. It is to be understood by a person of ordinary skill in the art that although this application has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the technical solutions of the embodiments of this application.

What is claimed is:

1. A method for controlling a display of an interface of a mobile terminal, the method comprising:
    displaying, while a first game application is running, a first game interface and a first virtual key in a main user interface in a full-screen mode, the first virtual key being configured to control the first game application; and
    in accordance with a determination that a switch mode is triggered:
        zooming out of the first game interface;
        displaying the first game interface in a first sub-interface; and
        displaying the first virtual key in a first touch interface, the first sub-interface and the first touch interface being provided in the main user interface, the first touch interface being configured to display the first virtual key for controlling the first game application.

2. The method according to claim 1, wherein after displaying the first game interface in the first sub-interface, and displaying the first virtual key in the first touch interface, the method further comprises:
    in response to a switch-back mode being triggered:
        displaying the first game interface and the first virtual key in the main user interface in full-screen mode.

3. The method according to claim 1, wherein after displaying the first game interface and the first virtual key in the main user interface in the full-screen mode, and the switch mode is triggered by a preset switch operation, the preset switch operation comprising at least one of a click operation, a press operation, a slide operation, a double-click operation, or a multi-touch operation.

4. The method according to claim 2, wherein after displaying the first game interface in the first sub-interface, and displaying the first virtual key in the first touch interface, the method further comprises:
    in response to detecting a touch input for a preset switch-back operation of the first sub-interface on a touchscreen: triggering the switch-back mode, the preset switch-back operation comprising at least one of a click operation, a press operation, a slide operation, a double-click operation, or a multi-touch operation.

5. The method according to claim 1, wherein after displaying the first game interface and the first virtual key in the main user interface in full-screen mode, the method further comprises:
    obtaining a device usage state through a gravity sensor, wherein the device usage state indicates an attitude of the mobile terminal being held by a user; and
    in accordance with a determination that the device usage state indicates that the mobile terminal is being held by the user in a portrait-screen usage state: triggering the switch mode.

6. The method according to claim 2, wherein after displaying the first game interface in the first sub-interface, and displaying the first virtual key in the first touch interface, the method further comprises:
    obtaining a device usage state through a gravity sensor, wherein the device usage state indicates an attitude of the mobile terminal being held by a user; and
    in accordance with a determination that the device usage state indicates that the mobile terminal is being held by the user in a landscape-screen usage state: triggering the switch-back mode.

7. The method according to claim 1, wherein after displaying the first game interface and the first virtual key in the main user interface in the full-screen mode, the method further comprises:
    obtaining a face image through a front-facing camera;
    determining, according to the face image, coordinates of a left eye and coordinates of a right eye;
    determining a two-eye coordinate connecting line according to the coordinates of a left eye and the coordinates of the right eye; and
    in accordance with a determination that an angle between the two-eye coordinate connecting line and a horizontal direction of the mobile terminal is less than or equal to an angle threshold: triggering the switch mode, the horizontal direction of the mobile terminal representing a horizontal direction of the mobile terminal in a portrait-screen usage state.

8. The method according to claim 2, wherein after displaying the first game interface in the first sub-interface, and displaying the first virtual key in the first touch interface, the method further comprises:
obtaining a face image through a front-facing camera;
determining, according to the face image, coordinates of a left eye and coordinates of a right eye;
determining a two-eye coordinate connecting line according to the left eye coordinates and the right eye coordinates; and
in accordance with a determination that an angle between the two-eye coordinate connecting line and a horizontal direction of the mobile terminal is greater than an angle threshold: triggering the switch-back mode, wherein the horizontal direction of the mobile terminal representing a horizontal direction of the mobile terminal in a portrait-screen usage state.

9. The method according to claim 1, wherein after displaying the first game interface and the first virtual key in the main user interface in the full-screen mode, the method further comprises:
monitoring an incoming call reminder; and
triggering the switch mode in response to an answering instruction for the incoming call reminder being triggered.

10. The method according to claim 1, wherein the first sub-interface and the first touch interface are both embedded interfaces; and
displaying the first game interface in the first sub-interface after the first game interface is zoomed out, and displaying the first virtual key in the first touch interface comprises:
providing the first sub-interface in a first preset region of the main user interface, the first preset region being a fixed region in the main user interface;
providing the first touch interface in a second preset region of the main user interface, the second preset region being another fixed region in the main user interface; and
displaying, after the first game interface is zoomed out, the first game interface in the first sub-interface in picture-in-picture mode, and displaying the first virtual key in the first touch interface in picture-in-picture mode.

11. The method according to claim 1, wherein the first sub-interface and the first touch interface are both floating window interfaces; and
displaying the first game interface in the first sub-interface, and displaying the first virtual key in the first touch interface comprises:
providing the first sub-interface at an upper layer of the main user interface;
providing the first touch interface at the upper layer of the main user interface; and
displaying, after zooming out of the first game interface, the first game interface in the first sub-interface in floating window mode, and displaying the first virtual key in the first touch interface in floating window mode.

12. An electronic device, comprising:
one or more processors; and
memory storing one or more programs, the one or more programs comprising instructions that, when executed by the one or more processors, cause the one or more processors to perform operations comprising:
displaying, while a first game application is running, a first game interface and a first virtual key in a main user interface in a full-screen mode, the first virtual key being configured to control the first game application; and
in accordance with a determination that a switch mode is triggered:
zooming out of the first game interface;
displaying the first game interface in a first sub-interface, and
displaying the first virtual key in a first touch interface, the first sub-interface and the first touch interface being provided in the main user interface, the first touch interface being configured to display the first virtual key for controlling the first game application.

13. The electronic device according to claim 12, wherein after displaying the first game interface in the first sub-interface, and displaying the first virtual key in the first touch interface, the method further comprises:
in response to a switch-back mode being triggered:
displaying the first game interface and the first virtual key in the main user interface in full-screen mode.

14. The electronic device according to claim 12, wherein after displaying the first game interface and the first virtual key in the main user interface in the full-screen mode, and the switch mode is triggered by a preset switch operation, the preset switch operation comprising at least one of a click operation, a press operation, a slide operation, a double-click operation, or a multi-touch operation.

15. The electronic device according to claim 12, wherein the first sub-interface and the first touch interface are both embedded interfaces; and
the displaying the first game interface in the first sub-interface after the first game interface is zoomed out, and displaying the first virtual key in the first touch interface comprises:
providing the first sub-interface in a first preset region of the main user interface, the first preset region being a fixed region in the main user interface;
providing the first touch interface in a second preset region of the main user interface, the second preset region being another fixed region in the main user interface; and
displaying, after the first game interface is zoomed out, the first game interface in the first sub-interface in picture-in-picture mode, and displaying the first virtual key in the first touch interface in picture-in-picture mode.

16. The electronic device according to claim 12, wherein the first sub-interface and the first touch interface are both floating window interfaces; and
displaying the first game interface in the first sub-interface, and displaying the first virtual key in the first touch interface comprises:
providing the first sub-interface at an upper layer of the main user interface;
providing the first touch interface at the upper layer of the main user interface; and
displaying, after zooming out of the first game interface, the first game interface in the first sub-interface in floating window mode, and displaying the first virtual key in the first touch interface in floating window mode.

17. A non-transitory computer-readable storage medium, storing a computer program, the computer program, when executed by one or more processors of an electronic device, cause the one or more processors to perform operations comprising:

displaying, while a first game application is running, a first game interface and a first virtual key in a main user interface in a full-screen mode, the first virtual key being configured to control the first game application; and in accordance with a determination that a switch mode is triggered:
  zooming out of the first game interface;
  displaying the first game interface in a first sub-interface, and
  displaying the first virtual key in a first touch interface, the first sub-interface and the first touch interface being provided in the main user interface, the first touch interface being configured to display the first virtual key for controlling the first game application.

18. The non-transitory computer-readable storage medium of claim 17, wherein after displaying the first game interface in the first sub-interface, and displaying the first virtual key in the first touch interface, the method further comprises:

in response to a switch-back mode being triggered:
  displaying the first game interface and the first virtual key in the main user interface in full-screen mode.

19. The non-transitory computer-readable storage medium of claim 17, wherein the first sub-interface and the first touch interface are both embedded interfaces; and
  displaying the first game interface in the first sub-interface after the first game interface is zoomed out, and displaying the first virtual key in the first touch interface comprises:
providing the first sub-interface in a first preset region of the main user interface, the first preset region being a fixed region in the main user interface;
providing the first touch interface in a second preset region of the main user interface, the second preset region being another fixed region in the main user interface; and
displaying, after the first game interface is zoomed out, the first game interface in the first sub-interface in picture-in-picture mode, and displaying the first virtual key in the first touch interface in picture-in-picture mode.

* * * * *